(12) United States Patent
Kamo

(10) Patent No.: US 10,036,313 B2
(45) Date of Patent: Jul. 31, 2018

(54) VARIABLE COMPRESSION RATIO INTERNAL COMBUSTION ENGINE

(71) Applicant: TOYOTA JIDOSHA KABUSHIKI KAISHA, Toyota-shi, Aichi-ken (JP)

(72) Inventor: Yoshiro Kamo, Kanagawa-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/591,302

(22) Filed: May 10, 2017

(65) Prior Publication Data

US 2017/0328276 A1 Nov. 16, 2017

(30) Foreign Application Priority Data

May 12, 2016 (JP) .................................. 2016-096195

(51) Int. Cl.
| | | |
|---|---|---|
| F02B 75/04 | (2006.01) | |
| F16C 7/06 | (2006.01) | |
| F15B 11/22 | (2006.01) | |
| F02D 15/02 | (2006.01) | |

(52) U.S. Cl.
CPC ............ F02B 75/045 (2013.01); F02D 15/02 (2013.01); F15B 11/22 (2013.01); F16C 7/06 (2013.01); *F15B 2211/7052* (2013.01); *F15B 2211/7107* (2013.01)

(58) Field of Classification Search
CPC ........ F02D 15/04; F02D 15/00; F02B 75/045; F02B 75/044; F02B 75/048; F02B 75/047; F16C 7/06; F16C 2360/22; F16C 3/28
See application file for complete search history.

(56) References Cited

U.S. PATENT DOCUMENTS

| | | | | |
|---|---|---|---|---|
| 9,677,469 | B2 * | 6/2017 | Wittek | .................. F02B 75/045 |
| 2015/0122077 | A1 | 5/2015 | Melde-Tuczai et al. | |
| 2015/0260094 | A1 * | 9/2015 | Wittek | .................. F02B 75/045 |
| | | | | 123/48 B |
| 2015/0260109 | A1 | 9/2015 | Wittek | |
| 2016/0305471 | A1 | 10/2016 | Wittek | |
| 2016/0319738 | A1 * | 11/2016 | Yamada | .................. F02B 75/32 |
| 2016/0341118 | A1 * | 11/2016 | Kamo | .................. F02B 75/045 |

FOREIGN PATENT DOCUMENTS

| | | |
|---|---|---|
| JP | 2015-527518 A | 9/2015 |
| WO | 2014/019684 A1 | 2/2014 |
| WO | 2015/082722 A2 | 6/2015 |

\* cited by examiner

*Primary Examiner* — Long T Tran
(74) *Attorney, Agent, or Firm* — Hunton Andrews Kurth LLP

(57) ABSTRACT

A variable compression ratio internal combustion engine comprises a crankshaft and a connecting rod. The connecting rod comprises a connecting rod body, a first hydraulic cylinder, a first hydraulic piston, a second hydraulic cylinder, a second hydraulic piston, a linking member, a hydraulic oil path, and a spool between a first operating position permitting supply of hydraulic oil from the second hydraulic cylinder to the first hydraulic cylinder, and a second operating position permitting supply of hydraulic oil from the first hydraulic cylinder to the second hydraulic. The variable compression ratio internal combustion engine further comprises a biasing member arranged inside the crank pin and biasing the spool so as to selectively switch a position of the spool between the first operating position and the second operating position.

12 Claims, 18 Drawing Sheets

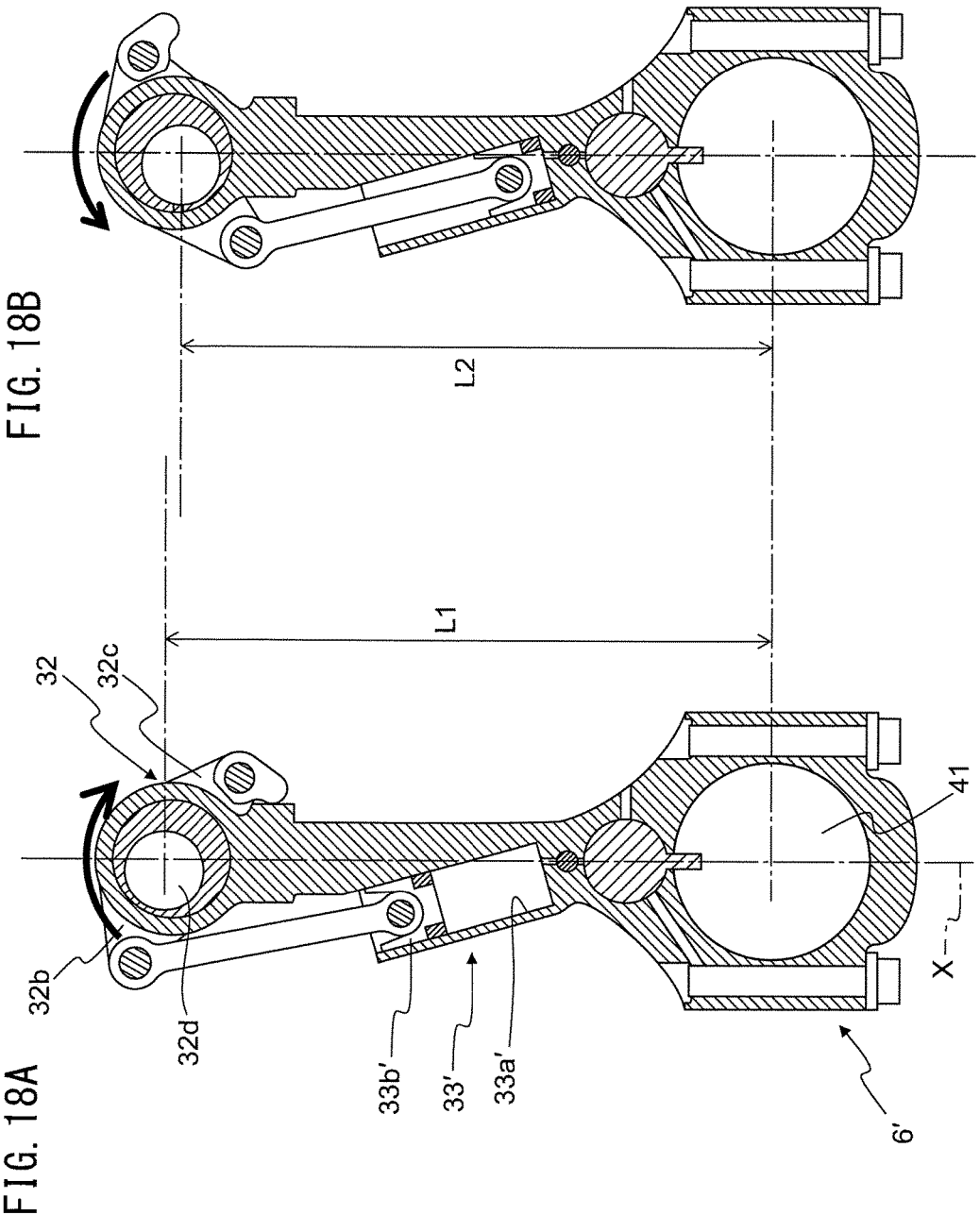

VARIABLE COMPRESSION RATIO INTERNAL COMBUSTION ENGINE

CROSS-REFERENCE TO RELATED APPLICATION

The present application claims priority to Japanese Patent Application No. 2016-096195 filed on May 12, 2016, which is incorporated herein by reference in its entirety.

TECHNICAL FIELD

The present invention relates to a variable compression ratio internal combustion engine which can change a mechanical compression ratio.

BACKGROUND ART

Known in the past has been an internal combustion engine provided with a variable compression ratio mechanism which can change a mechanical compression ratio of the internal combustion engine. As such a variable compression ratio mechanism, various mechanisms have been proposed. As one among these, one which can change the effective length of a connecting rod used in the internal combustion engine may be mentioned (for example, PTLs 1 to 3). In this regard, the "effective length of a connecting rod" means the length between a center of a crank receiving opening which receives a crank pin and a center of a piston pin receiving opening which receives a piston pin. Therefore, if the effective length of a connecting rod becomes longer, a combustion chamber volume when the piston is at top dead center of the compression stroke becomes smaller, and therefore the mechanical compression ratio increases. On the other hand, if the effective length of a connecting rod becomes shorter, the combustion chamber volume when the piston is at top dead center of the compression stroke becomes larger, and therefore the mechanical compression ratio falls.

As described in PLTs 1 to 3, as a variable length connecting rod able to be changed in its effective length, there is known a connecting rod which moves a piston mechanism provided inside a connecting rod by hydraulic oil to change the effective length. In such a variable length connecting rod, to control the position of the piston mechanism and in turn the effective length of the connecting rod, it is necessary to control the flow of hydraulic oil supplied to the piston mechanism.

PLT 1 describes moving the position of a spool arranged in a hydraulic oil path formed inside of a connecting rod body so as to switch the direction of flow of the hydraulic oil. The spool is switched in its position by striking a cam disk arranged inside an oil pan at the time of rotation of the crankshaft. The position of the cam disk is controlled by an electric powered motor arranged inside the oil pan. By controlling the position of the cam disk, the position of the spool is switched and the effective length of the connecting rod is changed.

CITATION LIST

Patent Literature

PLT 1: WO2014/019684A
PLT 2: WO2015/082722A
PLT 3: Japanese Patent Publication No. 2015-527518A

SUMMARY OF INVENTION

Technical Problem

However, when arranging additional parts such as a cam disk and an electric powered motor inside an oil pan, the engine body becomes larger. It becomes difficult to mount such a variable length connecting rod on an existing internal combustion engine.

Therefore, considering the above problem, an object of the present invention is to provide a variable compression ratio internal combustion engine able to keep the engine body from becoming larger while changing the effective length of the connecting rod.

Solution to Problem

In order to solve the above problem, in a first aspect, there is provided a variable compression ratio internal combustion engine comprising a crankshaft and a connecting rod connected to the crankshaft, wherein the connecting rod comprises a connecting rod body provided with a crank receiving opening receiving a crank pin of the crankshaft, a first hydraulic cylinder formed at the connecting rod body and to which hydraulic oil is supplied, a first hydraulic piston sliding inside the first hydraulic cylinder, a second hydraulic cylinder formed at the connecting rod body and to which hydraulic oil is supplied, a second hydraulic piston sliding inside the second hydraulic cylinder, a linking member provided with a piston pin receiving opening receiving a piston pin and moving in linkage with the first hydraulic piston and the second hydraulic piston so as to change a length between a center of the piston pin receiving opening and a center of the crank receiving opening, a hydraulic oil path formed inside the connecting rod body and communicating with the first hydraulic cylinder and the second hydraulic cylinder, and a spool arranged inside the hydraulic oil path and moving between a first operating position prohibiting supply of hydraulic oil through the hydraulic oil path from the first hydraulic cylinder to the second hydraulic cylinder and permitting supply of hydraulic oil through the hydraulic oil path from the second hydraulic cylinder to the first hydraulic cylinder, and a second operating position permitting supply of hydraulic oil through the hydraulic oil path from the first hydraulic cylinder to the second hydraulic cylinder and prohibiting supply of hydraulic oil through the hydraulic oil path from the second hydraulic cylinder to the first hydraulic cylinder, characterized in that the variable compression ratio internal combustion engine further comprises a biasing member arranged inside the crank pin and biasing the spool so as to selectively switch a position of the spool between the first operating position and the second operating position.

In order to solve the above problem, in a second aspect, there is provided variable compression ratio internal combustion engine comprising a crankshaft and a connecting rod connected to the crankshaft, wherein the connecting rod comprises a connecting rod body provided with a crank receiving opening receiving a crank pin of the crankshaft, a hydraulic cylinder formed at the connecting rod body and to which hydraulic oil is supplied, a hydraulic piston sliding inside the hydraulic cylinder, a linking member provided with a piston pin receiving opening receiving a piston pin and moving in linkage with the hydraulic piston so as to change a length between a center of the piston pin receiving opening and a center of the crank receiving opening, a hydraulic oil path formed inside the connecting rod body and communicating with the hydraulic cylinder, and a spool arranged inside the hydraulic oil path and moving between a first operating position permitting supply of hydraulic oil through the hydraulic oil path to the hydraulic cylinder and prohibiting discharge of hydraulic oil through the hydraulic oil path from the hydraulic cylinder, and a second operating position prohibiting supply of hydraulic oil through the hydraulic oil path to the hydraulic cylinder and permitting discharge of hydraulic oil through the hydraulic oil path from the hydraulic cylinder, characterized in that the variable compression ratio internal combustion engine further comprises a biasing member arranged inside the crank pin and biasing the spool so as to selectively switch a position of the spool between the first operating position and the second operating position.

In a third aspect, the engine further comprises a biasing spring biasing the biasing member, and the biasing member is switched by oil pressure supplied to the biasing member so as to make the biasing spring contract and the biasing force of the biasing spring between a first biasing position switching the spool to the first operating position and a second biasing position switching the spool to the second operating position, in the first or second aspect.

In a fourth aspect, the biasing member is switched by oil pressure supplied to one end part of the biasing member and oil pressure supplied to the other end part of the biasing member between a first biasing position switching the spool to the first operating position and a second biasing position switching the spool to the second operating position, in the first or second aspect.

In a fifth aspect, the spool moves in parallel with a center axial line of the crank receiving opening when it moves between the first operating position and the second operating position, in any one of the first to fourth aspects.

According to the present invention, there is provided a variable compression ratio internal combustion engine able to keep the engine body from becoming larger while changing the effective length of the connecting rod.

BRIEF DESCRIPTION OF DRAWINGS

FIG. 18A is a side cross-sectional view schematically showing a variable length connecting rod according to the third embodiment.

FIG. 18B is a side cross-sectional view schematically showing a variable length connecting rod according to the third embodiment.

DESCRIPTION OF EMBODIMENTS

Figure 1:
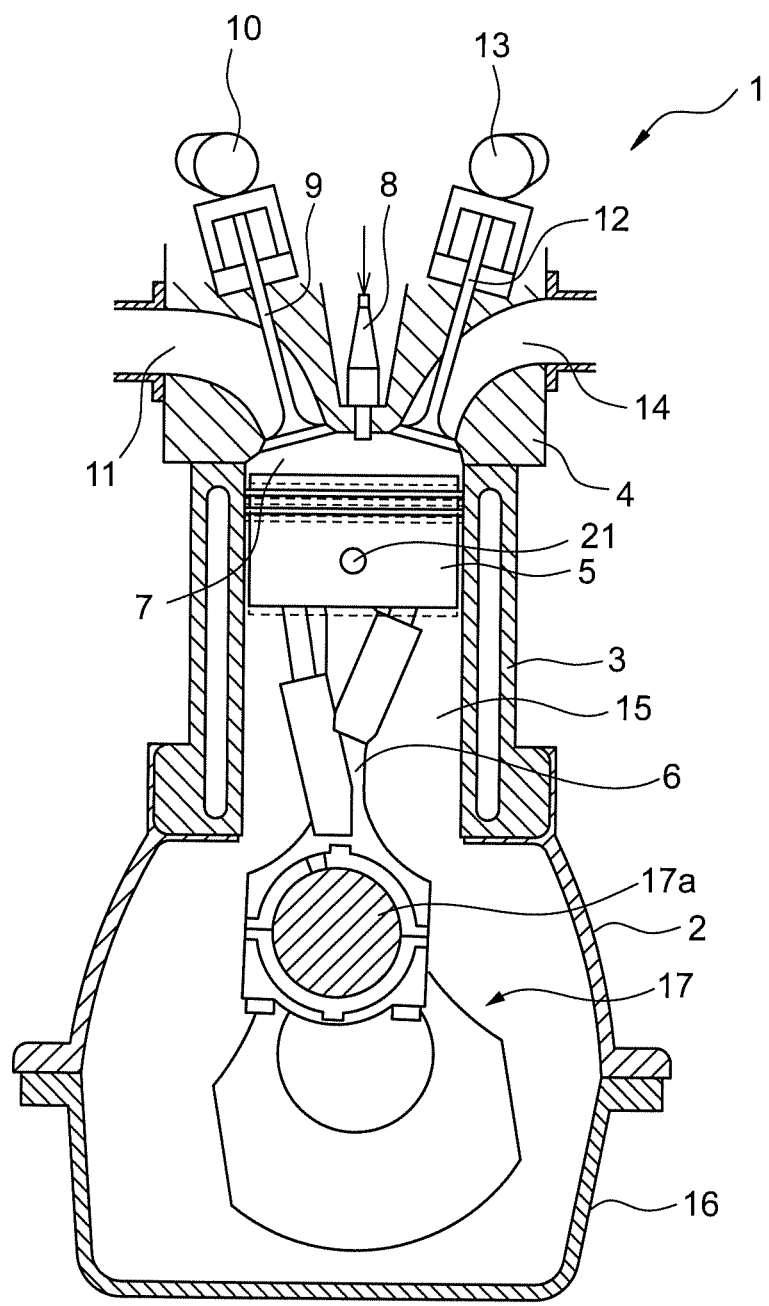
FIG. 1 is a schematic side cross-sectional view of a variable compression ratio internal combustion engine according to a first embodiment.

Below, referring to the drawings, an embodiment of the present invention will be explained in detail. Note that, in the following explanation, similar component elements are assigned the same reference notations.

<First Embodiment>

First, referring to FIGS. 1-12, a variable compression ratio internal combustion engine according to a first embodiment of the present invention will be explained.

<Variable Compression Ratio Internal Combustion Engine>

FIG. 1 is a schematic side cross-sectional view of a variable compression ratio internal combustion engine according to a first embodiment. Referring to FIG. 1, 1 shows an internal combustion engine. The internal combustion engine 1 is comprising a crankshaft case 2, cylinder block 3, cylinder head 4, pistons 5, variable length connecting rods 6, combustion chambers 7, spark plugs 8 arranged at the center parts of top surfaces of the combustion chambers 7, intake valves 9, an intake camshaft 10, intake ports 11, exhaust valves 12, an exhaust camshaft 13, exhaust ports 14, oil pan 16 and crank shaft 17. The cylinder block 3 forms cylinders 15. The pistons 5 reciprocate inside the cylinders 15.

The variable length connecting rod 6 is connected at a small diameter end part thereof by a piston pin 21 to the piston 5, and is connected at a large diameter end part thereof to a crank pin 17a of the crankshaft 17. The variable length connecting rod 6, as explained later, can change the length from the axis of the piston pin 21 to the axis of the crank pin 17a, that is, the effective length.

If the effective length of the variable length connecting rod 6 becomes longer, the length from the crank pin 17a to the piston pin 21 is longer, and therefore as shown by the solid line in the figure, the volume of the combustion chamber 7 when the piston 5 is at top dead center is smaller. On the other hand, even if the effective length of the variable length connecting rod 6 changes, the stroke length of the piston 5 reciprocating in the cylinder does not change. Therefore, at this time, the mechanical compression ratio at the internal combustion engine 1 becomes higher.

On the other hand, if the effective length of the variable length connecting rod 6 is shorter, the length from the crank pin 17a to the piston pin 21 is shorter, and therefore as shown by the broken line in the figure, the volume of the combustion chamber when the piston 5 is at top dead center is larger. However, as explained above, the stroke length of the piston 5 is constant. Therefore, at this time, the mechanical compression ratio at the internal combustion engine 1 becomes lower.

<Configuration of Variable Length Connecting Rod>

Figure 2:
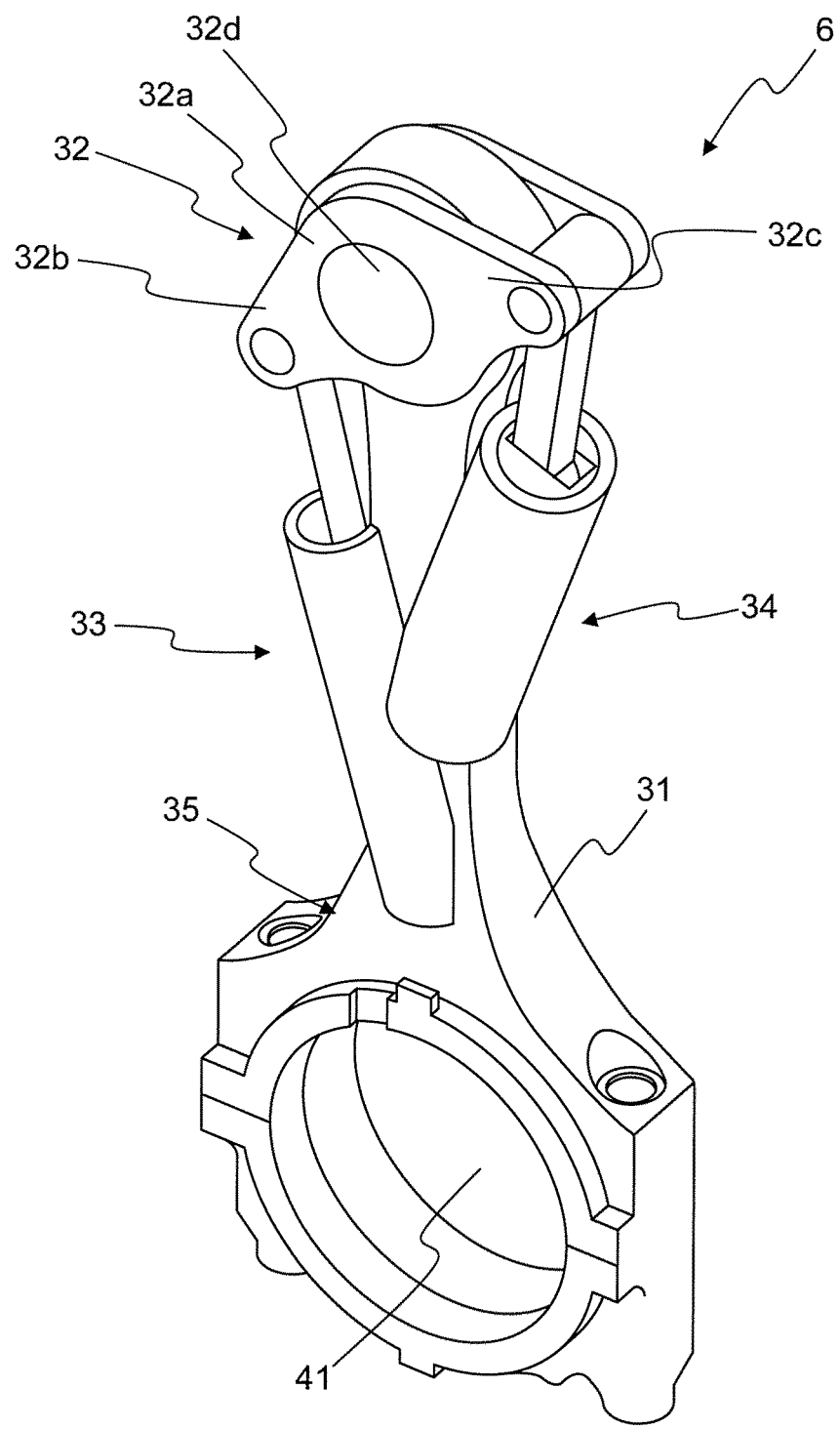
FIG. 2 is a perspective view schematically showing a variable length connecting rod according to the first embodiment.
Figure 3:
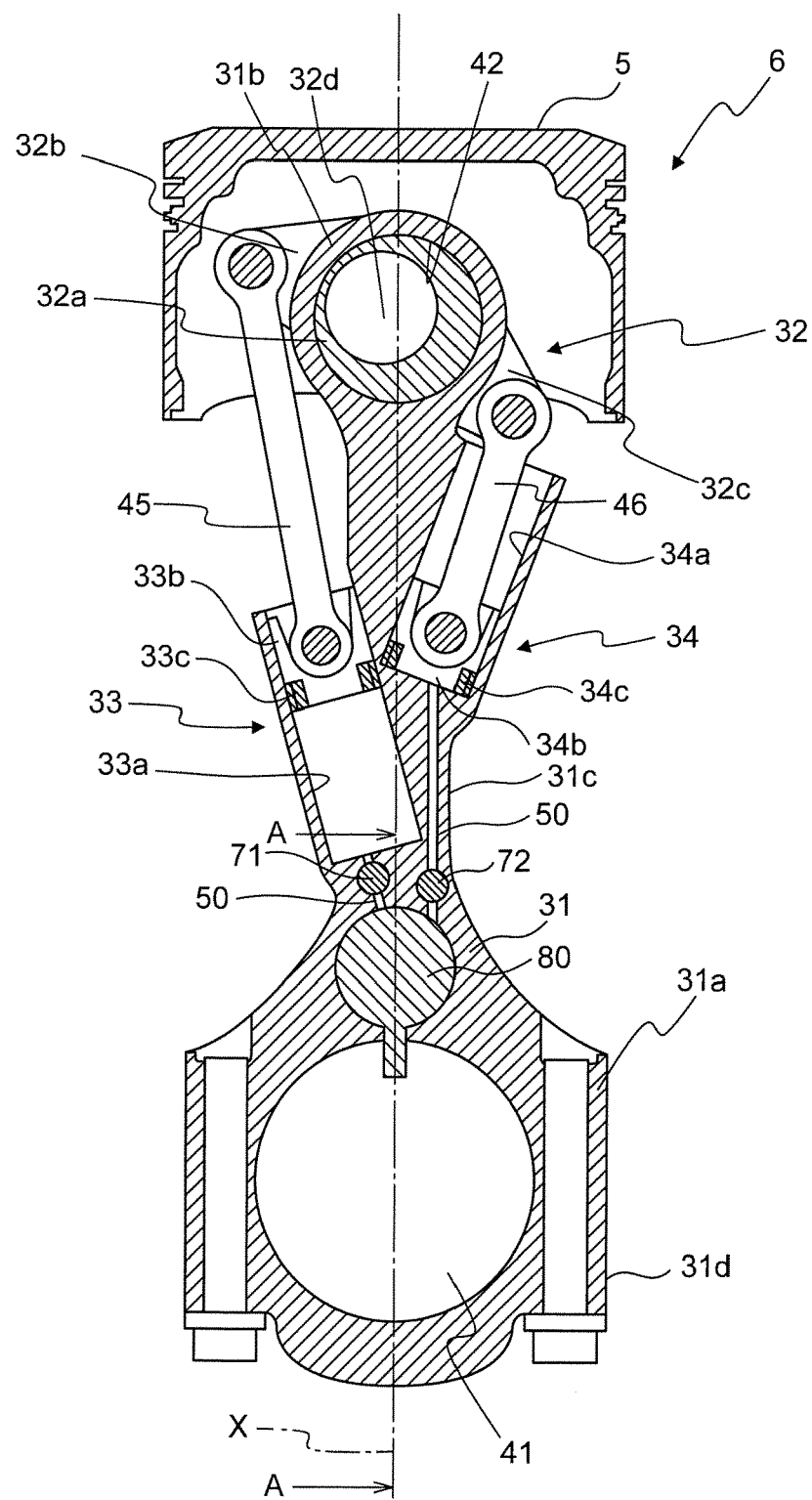
FIG. 3 is a side cross-sectional view schematically showing a variable length connecting rod according to the first embodiment.

FIG. 2 is a perspective view schematically showing a variable length connecting rod 6 according to a first embodiment, while FIG. 3 is a side cross-sectional view schematically showing a variable length connecting rod 6 according to a first embodiment. As shown in FIG. 2 and FIG. 3, the variable length connecting rod 6 comprises a connecting rod body 31, an eccentric member 32 attached to the connecting rod body 31 to be able to swivel, a first hydraulic piston mechanism 33 and a second hydraulic piston mechanism 34 provided at the connecting rod body 31, a first connecting member 45 connecting the eccentric member 32 and the first hydraulic piston mechanism 33, and a second connecting member 46 connecting the eccentric member 32 and the second hydraulic piston mechanism 34.

<Connecting Rod Body>

First, the connecting rod body 31 will be explained. The connecting rod body 31 has a large diameter end part 31a provided with a crank receiving opening 41 receiving a crank pin 17a of the crankshaft, a small diameter end part 31b provided with a sleeve receiving opening 42 receiving a later explained sleeve 32a of the eccentric member 32, and a rod part 31c extending between the large diameter end part 31a and the small diameter end part 31b. The large diameter end part 31a is formed by a cap part 31d of the connecting rod body 31 being bolted to the rod part 31c. The small diameter end part 31b is arranged at the piston 5 side and is positioned at the opposite side of the large diameter end part 31a. Note that, the crank receiving opening 41 is larger than the sleeve receiving opening 42, so the end part of the connecting rod body 31 at the side where the crank receiving opening 41 is provided is called the "large diameter end part 31a", while the end part of the connecting rod body 31 at the side where the sleeve receiving opening 42 is provided is called the "small diameter end part 31b".

Further, in the present Description, the line X extending between the center axis of the crank receiving opening 41 (that is, the axis of the crankpin 17a received in the crank receiving opening 41) and the center axis of the first sleeve receiving opening 42 (that is, the axis of the sleeve 32a received in the sleeve receiving opening 42) (FIG. 3), that is, the line passing through the center of the connecting rod body 31, will be called the "axis X of the connecting rod 6 and connecting rod body 31".

Further, the length of the connecting rod 6 in a direction vertical to the axis X of the connecting rod 6 and vertical to the center axis of the crank receiving opening 41 will be called the "width of the connecting rod 6". In addition, the length of the connecting rod 6 in a direction parallel to the center axis of the crank receiving opening 41 will be called the "thickness of the connecting rod 6". As will be understood from FIG. 2 and FIG. 3, the width of the connecting rod body 31 is the smallest at the rod part 31c between the large diameter end part 31a and the small diameter end part 31b leaving aside the region where the hydraulic piston mechanisms 33 and 34 are provided. Further, the width of the large diameter end part 31a is larger than the width of the small diameter end part 31b. On the other hand, the thickness of the connecting rod body 31 is made a substantially constant thickness leaving aside the region where the hydraulic piston mechanisms 33 and 34 are provided.

<Eccentric Member>

Figure 4:
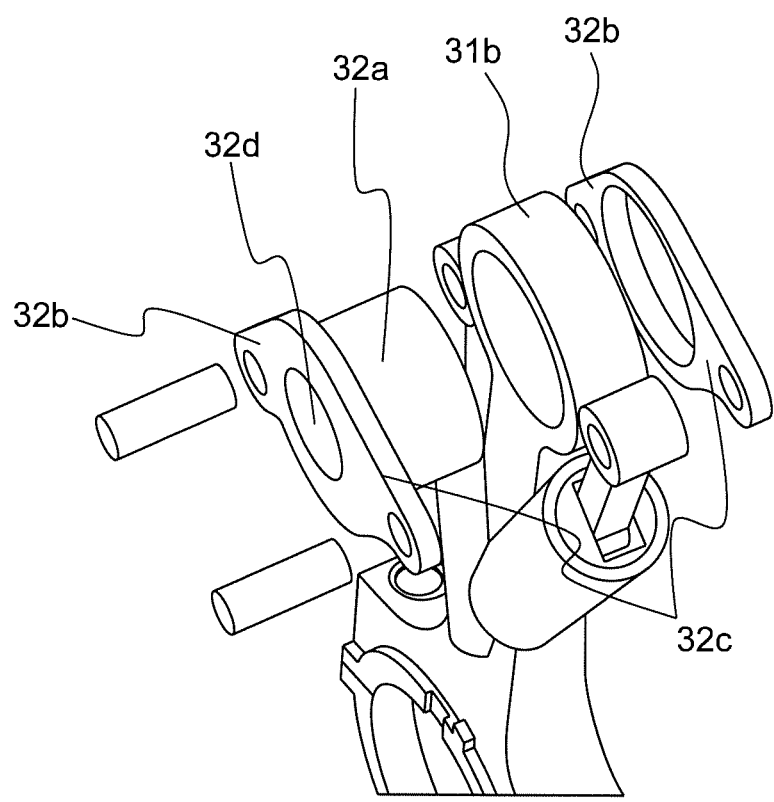
FIG. 4 is a schematic disassembled perspective view of the vicinity of a small diameter end part of a connecting rod body.

Next, the eccentric member 32 will be explained. FIG. 4 is a schematic disassembled perspective view of the vicinity of the small diameter end part 31b of the connecting rod body 31. In FIG. 4, the eccentric member 32 is shown in the disassembled state. Referring to FIG. 2 to FIG. 4, the eccentric member 32 is provided with a cylindrical sleeve 32a received in the sleeve receiving opening 42 formed in the connecting rod body 31, a pair of first arms 32b extending from the sleeve 32a in one direction in the width direction of the connecting rod body 31, and a pair of second arms 32c extending from the sleeve 32a in the other direction in the width direction of the connecting rod body 31 (substantially opposite direction to above one direction). The sleeve 32a can turn inside the sleeve receiving opening 42. For this reason, the eccentric member 32 is attached at the small diameter end part 31b of the connecting rod 31 to be able to turn with respect to the connecting rod body 31 in the circumferential direction of the small diameter end part 31b. The axial line of rotation of the eccentric member 32 matches the center axial line of the sleeve receiving opening 42.

Further, at the sleeve 32a of the eccentric member 32, the piston pin receiving opening 32d receiving the piston pin 21 is provided. This piston pin receiving opening 32d is formed in a cylindrical shape. The cylindrically shaped piston pin receiving opening 32d is formed so that its axial line is parallel with the center axial line of the cylindrical outer shape of the sleeve 32a, but is not coaxial. Therefore, the axial line of the piston pin receiving opening 32d is offset from the center axial line of the cylindrical outer shape of the sleeve 32a, that is, the axial line of rotation of the eccentric member 32.

In this way, in the present embodiment, the center axial line of the piston pin receiving opening 32d is offset from the axial line of rotation of the eccentric member 32. For this reason, if the eccentric member 32 rotates, the position of the piston pin receiving opening 32d inside of the sleeve receiving opening 42 changes. When the position of the piston pin receiving opening 32d is at the large diameter end part 31a side in the sleeve receiving opening 42, the effective length of the connecting rod becomes shorter. Conversely, when the position of the piston pin receiving opening 32d is at the side opposite to the large diameter end part 31a side, that is, the small diameter end part 31b side, in the sleeve receiving opening 42, the effective length of the connecting rod becomes longer. Therefore, according to this embodiment, the effective length of the connecting rod 6 is changed by making the eccentric member 32 turn. That is, the eccentric member 32 is attached to the small diameter end part 31b of the connecting rod body 31 to be able to turn so as to change the effective length of the connecting rod 6.

<Hydraulic Piston Mechanism>

Next, referring to FIG. 3, the first hydraulic piston mechanism 33 will be explained. The first hydraulic piston mechanism 33 has a first hydraulic cylinder 33a formed at the rod part 31c of the connecting rod body 31, a first hydraulic piston 33b sliding inside the first hydraulic cylinder 33a, and a first oil seal 33c sealing in the hydraulic oil supplied to the inside of the first hydraulic cylinder 33a. The first hydraulic cylinder 33a is almost entirely or entirely arranged at the side of the first arm 32b from the axis X of the connecting rod 6. Further, the first hydraulic cylinder 33a extends slanted by a certain extent of angle with respect to the axis X so as to stick out further to the outside of the connecting rod body 31 in the width direction the closer to the small diameter end part 31b.

The first hydraulic piston 33b is connected by the first connecting member 45 to the first arm 32b of the eccentric member 32. The first hydraulic piston 33b is connected by a pin to the first connecting member 45 to be able to rotate. As shown in FIG. 4, the first arms 32b of the eccentric member 32 are connected by a pin to the first connecting member 45 to be able to rotate at the end part at the opposite side to the side connected to the sleeve 32a. Therefore, the first hydraulic piston 33b moves in linkage with the eccentric member 32. The first oil seal 33c has a ring shape and is attached to the circumference of the bottom end part of the first hydraulic piston 33b.

Next, the second hydraulic piston mechanism 34 will be explained. The second hydraulic piston mechanism 34 has a second hydraulic cylinder 34a formed at a rod part 31c of the connecting rod body 31, a second hydraulic piston 34b sliding inside of the second hydraulic cylinder 34a, and a second oil seal 34c sealing in the hydraulic oil supplied to the inside of the second hydraulic cylinder 34a. The second hydraulic cylinder 34a is almost entirely or entirely arranged at the second arm 32c side from the axial line X of the connecting rod 6. Further, the second hydraulic cylinder 34a extends slanted by exactly a certain extent of angle from the axial line X so as to project out further to the outside in the width direction of the connecting rod body 31 the closer to the small diameter end part 31b.

The second hydraulic piston 34b is connected with the second arms 32c of the eccentric member 32 by the second connecting member 46. The second hydraulic piston 34b is connected by a pin to the second connecting member 46 to be able to rotate. As shown in FIG. 4, the second arms 32c are connected by a pin to the second connecting member 46 to be able to rotate at the end part at the opposite side to the side connected to the sleeve 32a. Therefore, the second hydraulic piston 34b moves in linkage with the eccentric member 32. The second oil seal 34c has a ring shape and is attached to the circumference of the bottom end part of the second hydraulic piston 34b.

<Flow Direction Switching Mechanism>

The variable length connecting rod 6 is further provided with a flow direction switching mechanism switching the flow of hydraulic oil to the first hydraulic piston mechanism 33 and the second hydraulic piston mechanism 34. The flow direction switching mechanism is provided with a hydraulic oil path 50 through which a hydraulic oil flows, check valves 71, 72 and a spool 80 controlling the flow of hydraulic oil, and a biasing member 61 switching the position of the spool 80. As shown in FIG. 3, the hydraulic oil path 50 is formed inside the connecting rod body 31 and communicates with the first hydraulic cylinder 33a and the second hydraulic cylinder 34a.

The two check valves 71, 72 and the single spool 80 are arranged in the hydraulic oil path 50 formed inside the connecting rod body 31. Specifically, the two check valves 71, 72 and the spool 80 are arranged in the axial line direction X of the connecting rod 6 between the crank receiving opening 41, and the first hydraulic cylinder 33a and second hydraulic cylinder 34a. Further, the check valves 71, 72 are arranged in the axial line direction X of the connecting rod 6 at the piston pin receiving opening 32d side from the spool 80. Further, the check valves 71, 72 are arranged at the both sides of the axial line X of the connecting rod 6, while the spool 80 is arranged on the axial line X of the connecting rod 6. Note that, as long as the spool 80 is arranged in the hydraulic oil path 50 between the two check valves 71, 72, the layout of the spool 80 and check valves 71, 72 may be different from the layout shown in FIG. 3.

Figure 5:
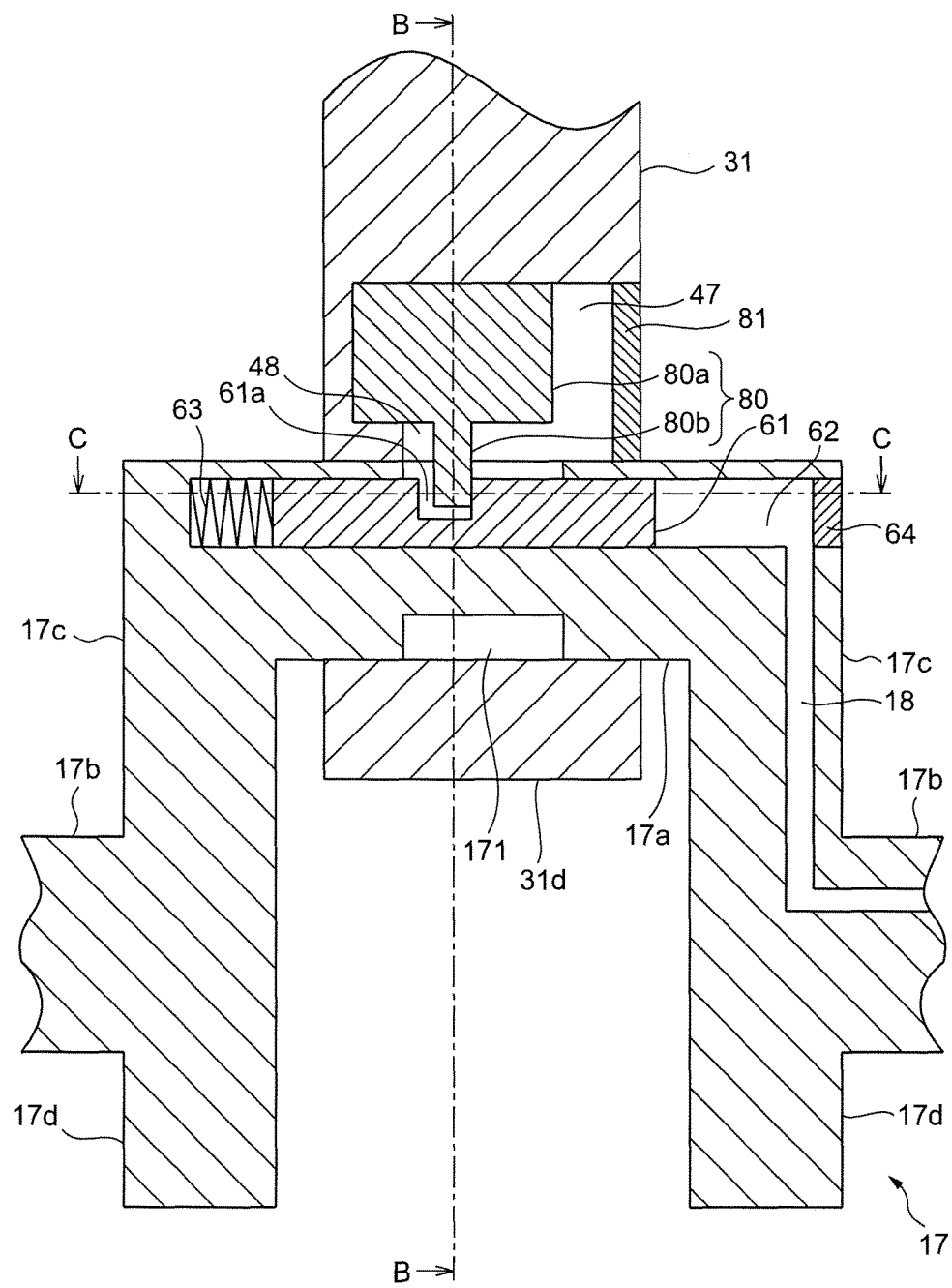
FIG. 5 is a schematic partial cross-sectional view of a connecting rod and crankshaft seen from a direction A-A of FIG. 3.
Figure 6:
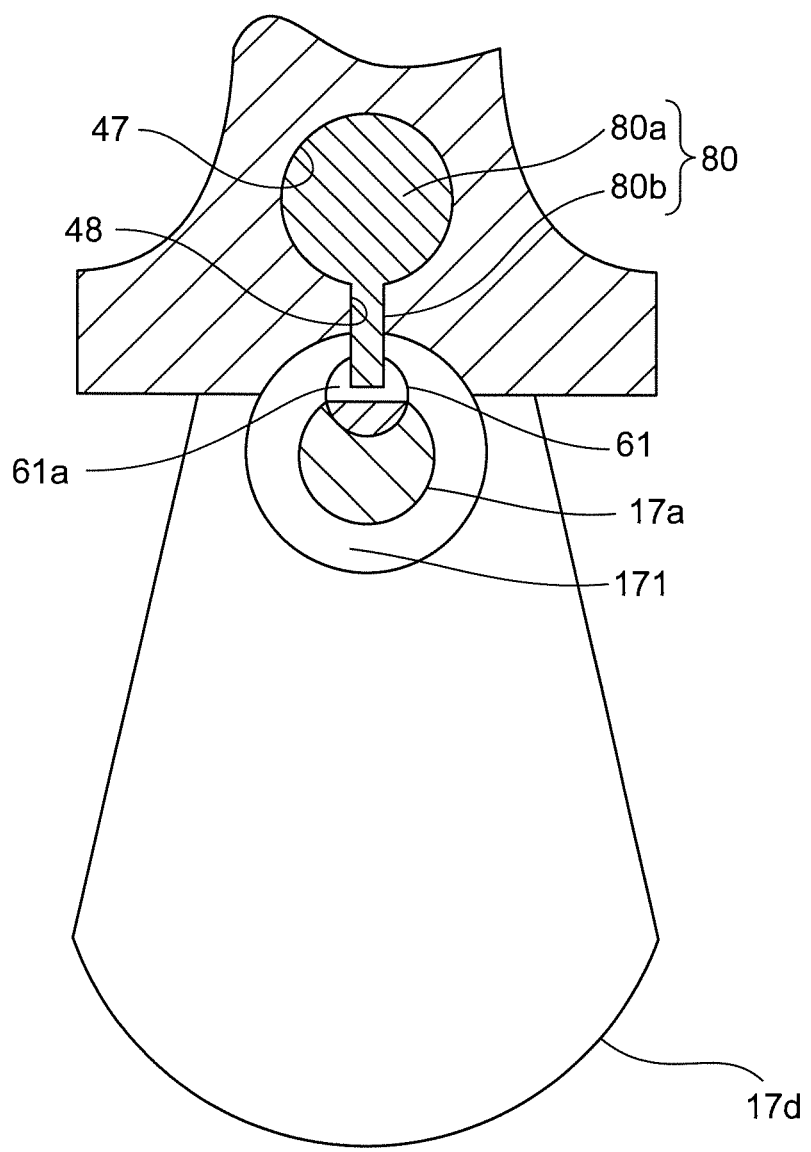
FIG. 6 is a schematic cross-sectional view of a connecting rod and crankshaft seen from a direction B-B of FIG. 5.
Figure 7:
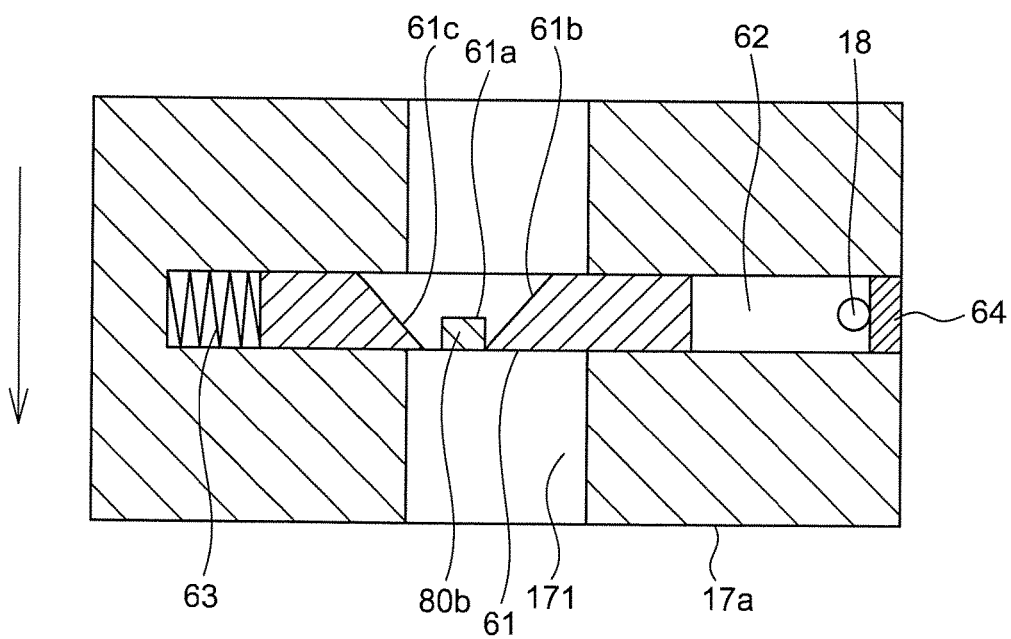
FIG. 7 is a schematic cross-sectional view of a crank pin seen from a direction C-C of FIG. 5.

FIG. 5 is a schematic partial cross-sectional view of a connecting rod 6 and crankshaft 17 seen from a direction A-A of FIG. 3. FIG. 6 is a schematic cross-sectional view of a connecting rod 6 and crankshaft 17 seen from a direction B-B of FIG. 5. FIG. 7 is a schematic cross-sectional view of a crank pin 17a seen from a direction C-C of FIG. 5. Note that, in FIG. 3, the crankshaft 17 is omitted. Further, in FIG. 6, the bottom end part of the connecting rod body 31 including the cap part 31d is omitted. The crankshaft 17 includes a crank pin 17a, crank journal 17b, crank arm 17c, and counterweight 17d.

As shown in FIG. 5, the spool 80 is held in a spool holding space 47 formed inside the connecting rod body 31. The spool holding space 47 is formed so as to have an axial line extending in parallel with the center axial line of the crank receiving opening 41. The spool 80 is inserted from one end part of the spool holding space 47. This end part is sealed by a first seal member 81 after insertion of the spool 80.

The spool 80 has a columnar shaped columnar part 80a and a projecting part 80b projecting out from the columnar part 80a. The projecting part 80b projects out in a direction vertical to the axial line direction of the columnar part 80a. The projecting part 80b is arranged in a sliding groove 48 of the spool holding space 47 and slides inside a sliding groove 48 parallel to the center axial line of the crank receiving opening 41. The projecting part 80b of the spool 80 is biased by the biasing member 61 at the time of rotation of the crankshaft 17, and thereby the spool 80 moves in parallel with the center axial line of the crank receiving opening 41. As shown in FIG. 5 to FIG. 7, the crank pin 17a of the crankshaft 17 is formed with a circumferential direction groove 171 extending in the circumferential direction so that at the time of rotation of the crankshaft 17, the projecting part 80b will not strike the crank pin 17a.

The biasing member 61 is arranged inside the crank pin 17a of the crankshaft 17. Specifically, the biasing member 61 is held in biasing member holding space 62 formed inside the crank pin 17a. Further, the biasing member holding space 62 also holds a biasing spring 63 biasing the biasing member 61. The biasing spring 63 is for example a coil spring and biases the biasing member 61 in a direction in parallel to the center axial line of the crank receiving opening 41.

The biasing member holding space 62 has a cylindrical shape and is formed so that its axial line extends in parallel with the center axial line of the crank receiving opening 41. The biasing member 61 and biasing spring 63 are inserted from one end part of the biasing member holding space 62. This end part is sealed by a second seal member 64 after insertion of the biasing member 61 and biasing spring 63.

The biasing member 61 has a columnar shape. The biasing member 61 is formed with a switching groove 61a. The switching groove 61a extends in a direction vertical to the axial line direction of the biasing member 61. As shown in FIG. 7, the switching groove 61a has a taper shaped first taper wall 61b and second taper wall 61c. The width of the switching groove 61a is reduced at the time of rotation of the crankshaft 17 in the direction in which the projecting part 80b of the spool 80 passes through the switching groove 61a (direction of arrow in FIG. 7).

Inside the crankshaft 17, more specifically inside the crank journal 17b and crank arms 17c of the crankshaft 17, an oil pressure supply path 18 for supplying oil pressure to the biasing member 61 is formed. The oil pressure supply path 18 is communicated with the biasing member holding space 62 at the end part at the opposite side to the end part where the biasing spring 63 is arranged. The oil pressure supply path 18 is supplied with oil from an oil pressure supply source (not shown) at the outside of the crankshaft 17. The oil pressure supplied through the oil pressure supply path 18 to the biasing member 61 acts so as to make the biasing spring 63 contract.

The magnitude of the oil pressure supplied through the oil pressure supply path 18 to the biasing member 61 is controlled by an oil pressure control valve (not shown) arranged between the oil pressure supply source and the oil pressure supply path 18. The biasing member 61 is switched between a first biasing position and second biasing position by the oil pressure supplied to the biasing member 61 so as to make the biasing spring 63 contract and the biasing force of the biasing spring 63. The biasing member 61 switches the spool 80 to the first operating position at the first biasing position, and switches the spool 80 to the second operating position at the second biasing position. The biasing member 61 moves in parallel with the center axial line of the crank receiving opening 41 when switched between the first biasing position and second biasing position.

In FIG. 5, the biasing member 61 is positioned at the first biasing position, while the spool 80 is positioned at the first operating position. When a threshold value or more of oil pressure is supplied to the biasing member 61, the biasing member 61 moves to the first biasing position due to contraction of the biasing spring 63 due to the oil pressure. At that time, the biasing member 61 moves against the biasing force of the biasing spring 63 in parallel with the center axial line of the crank receiving opening 41. The threshold value of the oil pressure is determined in accordance with the cross-sectional area of the biasing member 61 (or cross-sectional area of the biasing member holding space 62), the elastic coefficient of the biasing spring 63, etc.

As will be understood from FIG. 7, if the biasing member 61 is switched from the second biasing position to the first biasing position, the projecting part 80b of the spool 80 is biased at the time of rotation of the crankshaft 17 by the first taper wall 61b of the biasing member 61. As a result, the spool 80 is switched from the second operating position to the first operating position. In the present embodiment, the position of the spool 80 is switched when the piston 5 passes top dead center. Note that the position of the spool 80 may be switched when the piston 5 passes another position between the top dead center and bottom dead center. For example, the spool 80 may be arranged at the cap part 31d of the connecting rod body 31 and the position of the spool 80 may be switched when the piston 5 passes bottom dead center.

Figure 8:
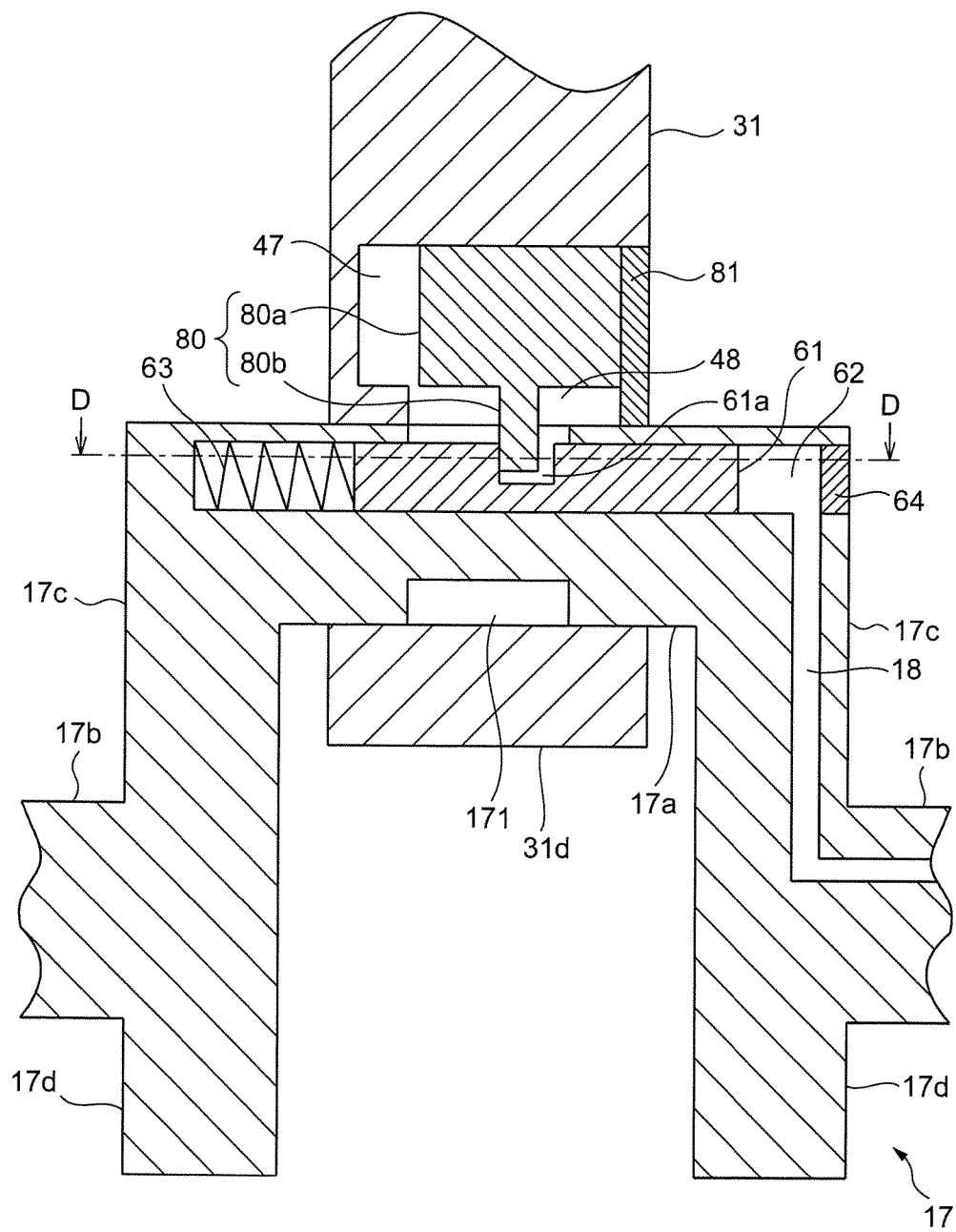
FIG. 8 is a view similar to FIG. 5 of when the biasing member is positioned at a second biasing position and a spool is positioned at a second operating position.
Figure 9:
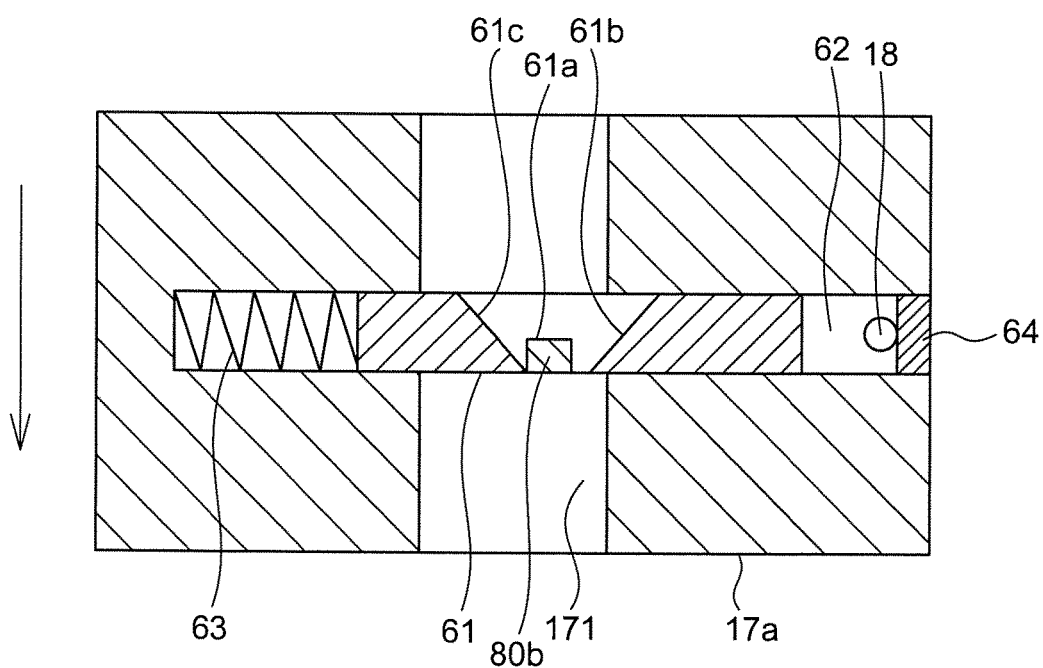
FIG. 9 is a schematic cross-sectional view of a crank pin seen from a direction D-D of FIG. 8.

FIG. 8 is a view similar to FIG. 5 of when the biasing member 61 is positioned at a second biasing position and a spool 80 is positioned at a second operating position. FIG. 9 is a schematic cross-sectional view of a crank pin 17a seen from a direction D-D of FIG. 8. If the biasing member 61 is not supplied with oil pressure or if the biasing member 61 is supplied with less than the threshold value of oil pressure, the biasing member 61 moves to the second biasing position due to the biasing force of the biasing spring 63. At this time, the biasing member 61 moves in parallel to the center axial line of the crank receiving opening 41 due to the biasing force of the biasing spring 63.

As will be understood from FIG. 9, if the biasing member 61 is switched from the first biasing position to the second biasing position, the projecting part 80b of the spool 80 is biased at the time of rotation of the crankshaft 17 by the second taper wall 61c of the biasing member 61. As a result, the spool 80 is switched from the first operating position to the second operating position. Therefore, the biasing member 61 biases the spool 80 so as to selectively switch the position of the spool 80 between the first operating position and the second operating position.

Figure 10:
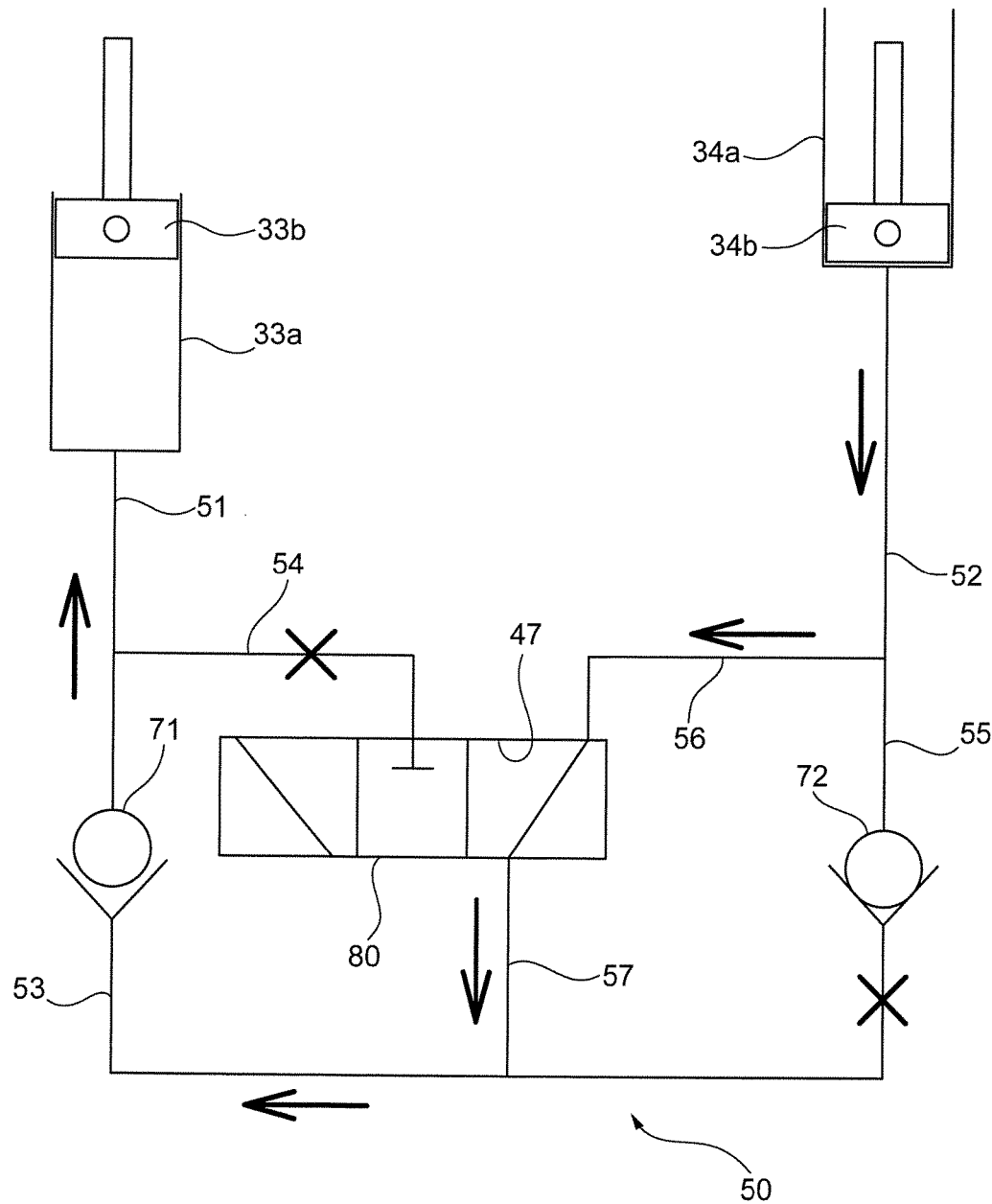
FIG. 10 is a view schematically showing a hydraulic oil path in the first embodiment of the present invention.
Figure 11:
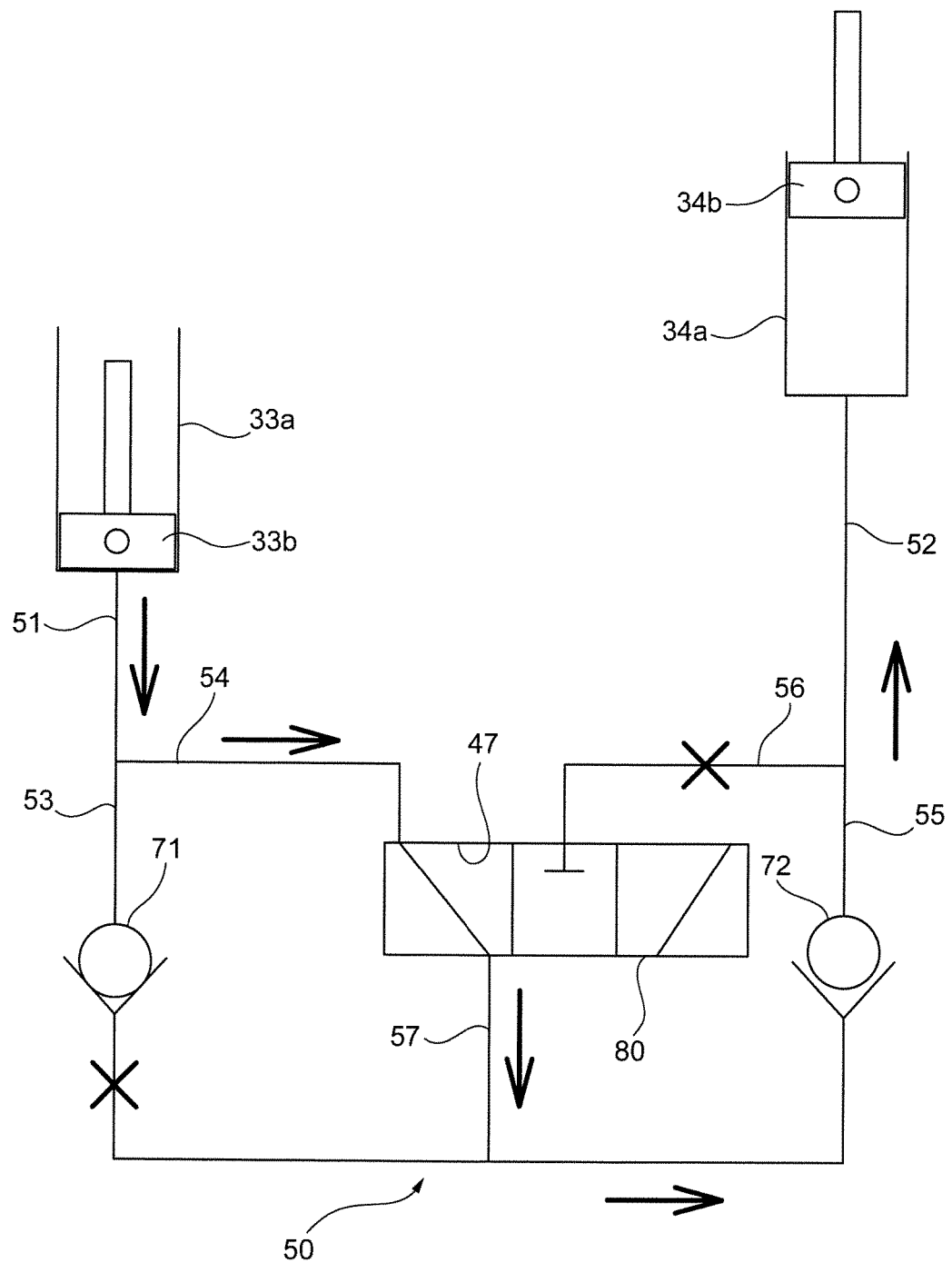
FIG. 11 is a view schematically showing a hydraulic oil path in the first embodiment of the present invention.

FIG. 10 and FIG. 11 are views schematically showing the hydraulic oil path 50 in the first embodiment of the present invention. The hydraulic oil path 50 has a first cylinder communicating oil path 51 communicated with the first hydraulic cylinder 33a, and a second cylinder communicating oil path 52 communicated with the second hydraulic cylinder 34a. The first cylinder communicating oil path 51 is branched into a first communicating oil path 53 and a first space communicating oil path 54. The second cylinder communicating oil path 52 is branched into a second connection oil path 55 and a second space communicating oil path 56.

The first space communicating oil path 54 communicates with the first cylinder communicating oil path 51 and the spool holding space 47. The first communicating oil path 53 communicates with a third space communicating oil path 57 communicated with the spool holding space 47 and the first cylinder communicating oil path 51. The second space communicating oil path 56 communicates with the second cylinder communicating oil path 52 and the spool holding space 47. The second connection oil path 55 communicates with the third space communicating oil path 57 and the second cylinder communicating oil path 52.

At the first communicating oil path 53, the first check valve 71 is arranged, while at the second connection oil path 55, the second check valve 72 is arranged. The first check valve 71 permits the flow of hydraulic oil in the first communicating oil path 53 from the spool holding space 47 to the first hydraulic cylinder 33a and prohibits the flow of hydraulic oil from the first hydraulic cylinder 33a to the spool holding space 47. The second check valve 72 permits the flow of hydraulic oil in the second connection oil path 55 from the spool holding space 47 to the second hydraulic cylinder 34a and prohibits the flow of hydraulic oil from the second hydraulic cylinder 34a to the spool holding space 47.

<Operation of Variable Length Connecting Rod>

Figures 12A, 12B:
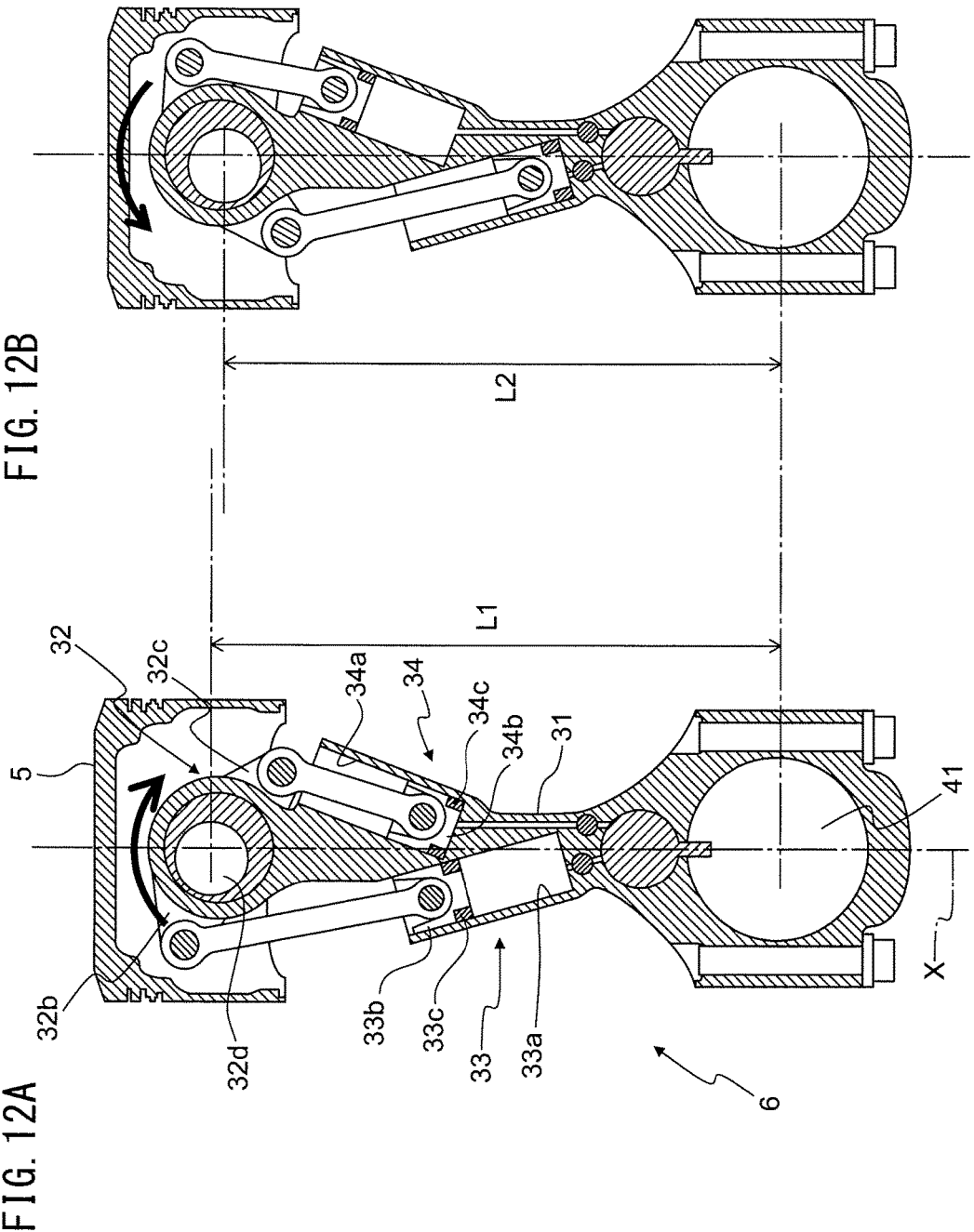
FIG. 12A is a side cross-sectional view schematically showing a variable length connecting rod according to the first embodiment.
FIG. 12B is a side cross-sectional view schematically showing a variable length connecting rod according to the first embodiment.

Next, referring to FIG. 10 to FIG. 12, the operation of the connecting rod 6 will be explained. FIG. 12A shows the state where the first hydraulic cylinder 33a is supplied with hydraulic oil and the second hydraulic cylinder 34a is not supplied with hydraulic oil. On the other hand, FIG. 12B shows the state where the second hydraulic cylinder 34a is supplied with hydraulic oil and the first hydraulic cylinder 33a is not supplied with hydraulic oil.

As explained above, when the biasing member 61 is positioned at the first biasing position, the spool 80 is positioned at the first operating position. In other words, when the biasing member 61 is supplied with the threshold value or more of oil pressure, the spool 80 is positioned at the first operating position. FIG. 10 shows the flow of hydraulic oil when the spool 80 is positioned at the first operating position. At the first position, the spool 80 cuts the communication of the first space communicating oil path 54 and the third space communicating oil path 57, and communicates the second space communicating oil path 56 and the third space communicating oil path 57 through the spool holding space 47. As a result, the flow of hydraulic oil from the second hydraulic cylinder 34a to the first hydraulic cylinder 33a is permitted, while the flow of hydraulic oil from the first hydraulic cylinder 33a to the second hydraulic cylinder 34a is prohibited. Therefore, at the first operating position, the spool 80 prohibits the supply of hydraulic oil through the hydraulic oil path 50 from the first hydraulic cylinder 33a to the second hydraulic cylinder 34a and permits the supply of hydraulic oil through the hydraulic oil path 50 from the second hydraulic cylinder 34a to the first hydraulic cylinder 33a.

In this regard, if the upward inertial force generated by reciprocating motion of the piston 5 inside the cylinder 15 of the internal combustion engine 1 acts on the piston pin 21, a downward force acts on the second hydraulic piston 34b. If this inertial force is generated after the spool 80 moves to the first operating position, the hydraulic oil inside the second hydraulic cylinder 34a is discharged from the second hydraulic cylinder 34a. As a result, the hydraulic oil inside the second hydraulic cylinder 34a passes through the second cylinder communicating oil path 52, the second space communicating oil path 56, the third space communicating oil path 57, the first connection oil path 53, and the first cylinder communicating oil path 51, and is supplied to the first hydraulic cylinder 33a. For this reason, the first hydraulic piston 33b ascends and the second hydraulic piston 34b descends.

The eccentric member 32 moves in linkage with the first hydraulic piston 33b and the second hydraulic piston 34b so as to make the effective length of the connecting rod 6 change. For this reason, as shown in FIG. 12A, the eccentric member 32 is turned in the direction of the arrow mark in the figure, and the piston pin receiving opening 32d ascends in position. As a result, the length between the center of the crank receiving opening 41 and the center of the piston pin receiving opening 32d, that is, the effective length of the connecting rod 6, becomes L1 in the figure. Therefore, if using the biasing member 61 to make the spool 80 move to the first operating position, the effective length of the connecting rod 6 becomes longer and, in turn, the mechanical compression ratio in the internal combustion engine 1 becomes higher.

On the other hand, when the biasing member 61 is positioned at the second biasing position, the spool 80 is positioned at the second operating position. In other words, when the biasing member 61 is supplied with less than the threshold value of oil pressure or is not supplied with oil pressure, the spool 80 is positioned at the second operating position. FIG. 11 shows the flow of hydraulic oil when the spool 80 is positioned at the second operating position. At the second position, the spool 80 communicates the first space communicating oil path 54 and the third space communicating oil path 57 through the spool holding space 47 and cuts the communication between the second space communicating oil path 56 and the third space communicating oil path 57. As a result, the flow of hydraulic oil from the first hydraulic cylinder 33a to the second hydraulic cylinder 34a is permitted, while the flow of hydraulic oil from the second hydraulic cylinder 34a to the first hydraulic cylinder 33a is prohibited. Therefore, at the second operating position, the spool 80 prohibits the supply of hydraulic oil through the hydraulic oil path 50 from the second hydraulic cylinder 34a to the first hydraulic cylinder 33a and permits the supply of hydraulic oil through the hydraulic oil path 50 from the first hydraulic cylinder 33a to the second hydraulic cylinder 34a.

In this regard, if the downward inertial force generated by reciprocating motion of the piston 5 inside the cylinder 15 of the internal combustion engine 1 and the downward explosive force generated by combustion of the air-fuel mixture inside the combustion chamber 7 act on the piston pin 21, a downward force acts on the first hydraulic piston 33b. If this inertial force and explosive force are generated after the spool 80 moves to the second operating position, the hydraulic oil inside the hydraulic cylinder 33a is discharged from the first hydraulic cylinder 33a. As a result, the hydraulic oil inside the first hydraulic cylinder 33a passes through the first cylinder communicating oil path 51, the first connection oil path 53, the third space communicating oil path 57, the second connection oil path 55, and the second cylinder communicating oil path 52, and is supplied to the second hydraulic cylinder 34a. For this reason, the first hydraulic piston 33b descends and the second hydraulic piston 34b ascends.

The eccentric member 32 moves in linkage with the first hydraulic piston 33b and the second hydraulic piston 34b so as to make the effective length of the connecting rod 6 change. For this reason, as shown in FIG. 12B, the eccentric member 32 is turned in the direction of the arrow mark in the figure (opposite direction to arrow mark of FIG. 12A) and the piston pin receiving opening 32d descends in position. As a result, the length between the center of the crank receiving opening 41 and the center of the piston pin receiving opening 32d, that is, the effective length of the connecting rod 6, becomes L2 shorter than L1 in the figure. Therefore, if using the biasing member 61 to make the spool 80 move to the second operating position, the effective length of the connecting rod 6 becomes shorter and, in turn, the mechanical compression ratio in the internal combustion engine 1 becomes lower.

In the present embodiment, as explained above, by using the biasing member 61 to switch the position of the spool 80 between the first operating position and the second operating position, it is possible to switch the effective length of the connecting rod 6 between L1 and L2. As a result, in the internal combustion engine 1 provided with the connecting rod 6, the mechanical compression ratio can be changed.

<Action and Effect in First Embodiment>

In the present embodiment, as explained above, the biasing member 61 switching the position of the spool 80 is arranged inside the crank pin 17a of the crankshaft 17. For this reason, the engine body (part comprised of cylinder head 4, cylinder block 3, crankcase 2, and oil pan 16) is kept from becoming larger while the effective length of the connecting rod 6 can be changed. Further, there is no need to supply oil pressure for controlling the biasing member 61 to the connecting rod body 31, so it is possible to shorten the oil pressure supply path and possible to improve the response when switching the mechanical compression ratio of the internal combustion engine 1.

In this regard, the inertial force generated by reciprocating motion of the piston 5 inside the cylinder 15 of the internal combustion engine 1 and the explosive force generated by combustion of the air-fuel mixture inside a combustion chamber 7 basically act in the vertical direction to the center axial line of the crank receiving opening 41. As opposed to this, in the present embodiment, the spool 80 moves parallel to the center axial line of the crank receiving opening 41 when moving between the first operating position and the second operating position. For this reason, in the present embodiment, almost no inertial force and explosive force act in the operating direction of the spool 80, so it is possible to suppress mistaken operation of the spool 80 due to inertial force and explosive force.

Note that, in the present embodiment, the eccentric member 32 corresponds to the linking member moving in linkage with the first hydraulic piston 33*b* and the second hydraulic piston 34*b* so as to change the effective length of the connecting rod 6.

<Second Embodiment>

Next, a variable compression ratio internal combustion engine according to the second embodiment of the present invention will be explained. The configuration and operation of the variable compression ratio internal combustion engine according to the second embodiment are basically similar to the configuration and operation of the variable compression ratio internal combustion engine according to the first embodiment except for the points explained below.

Figure 13:
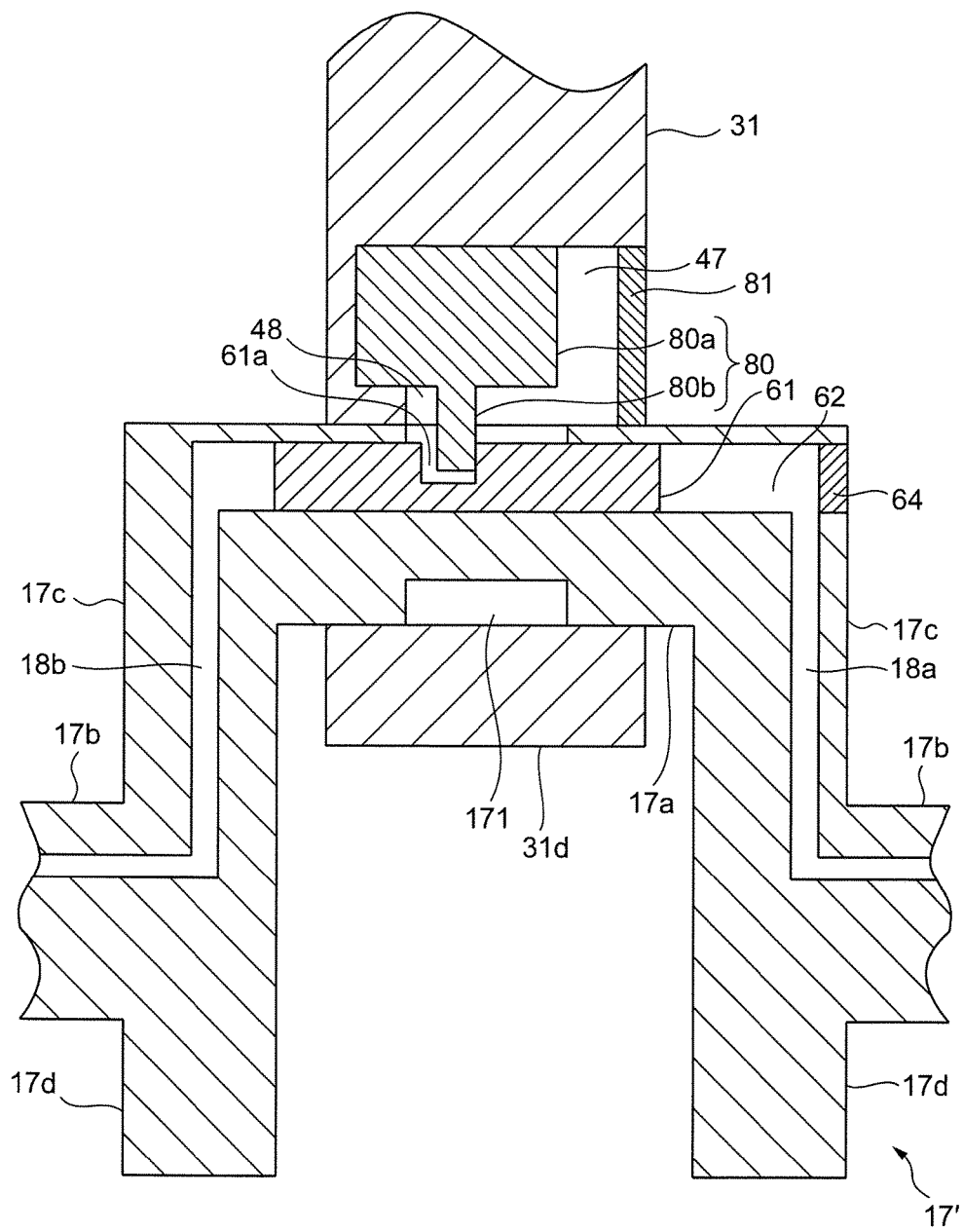
FIG. 13 is a schematic partial cross-sectional view of a connecting rod and crankshaft seen from a direction A-A of FIG. 3.

The variable length connecting rod in the first embodiment is the same as the variable length connecting rod in the second embodiment. FIG. 13 is a schematic partial cross-sectional view of a connecting rod 6 and crankshaft 17' seen from a direction A-A of FIG. 3. Note that, in FIG. 3, the crankshaft 17' is omitted. In the second embodiment, the biasing member 61 is switched between the first biasing position switching the spool 80 to the first operating position and the second biasing position switching the spool 80 to the second operating position by the oil pressure supplied to one end part of the biasing member 61 and the oil pressure supplied to the other end part of the biasing member 61. Due to this, at the time of a low temperature where the oil is high in viscosity, it is possible to improve the response when switching the position of the spool 80 and in turn the response when switching the mechanical compression ratio of the internal combustion engine 1.

Inside the crankshaft 17', more specifically inside the crank journal 17*b* and crank arm 17*c* of the crankshaft 17', a first oil pressure supply path 18*a* for supplying oil pressure to one end part of the biasing member 61 and a second oil pressure supply path 18*b* for supplying oil pressure to the other end part of the biasing member 61 are formed. The first oil pressure supply path 18*a* is communicated with the biasing member holding space 62 at one end part of the biasing member holding space 62. The second oil pressure supply path 18*b* is communicated with the biasing member holding space 62 at the other end part of the biasing member holding space 62. The first oil pressure supply path 18*a* and the second oil pressure supply path 18*b* are supplied with oil from an oil pressure supply source (not shown) at the outside of the crankshaft 17'.

The magnitude of the oil pressure supplied through the first oil pressure supply path 18*a* to one end part of the biasing member 61 is controlled by a first oil pressure control valve (not shown) arranged between the oil pressure supply source and the first oil pressure supply path 18*a*. The magnitude of the oil pressure supplied through the second oil pressure supply path 18*b* to the other end part of the biasing member 61 is controlled by a second oil pressure control valve (not shown) arranged between the oil pressure supply source and the second oil pressure supply path 18*b*.

If making the oil pressure supplied through the first oil pressure supply path 18*a* to one end part of the biasing member 61 larger than the oil pressure supplied through the second oil pressure supply path 18*b* to the other end part of the biasing member 61, the biasing member 61 is switched to the first biasing position. As a result, the spool 80 is switched to the first operating position. On the other hand, if making the oil pressure supplied through the first oil pressure supply path 18*a* to one end part of the biasing member 61 smaller than the oil pressure supplied through the second oil pressure supply path 18*b* to the other end part of the biasing member 61, the biasing member 61 is switched to the second biasing position. As a result, the spool 80 is switched to the second operating position.

<Third Embodiment>

Next, a variable compression ratio internal combustion engine according to a third embodiment of the present invention will be explained. The configuration and operation of the variable compression ratio internal combustion engine according to the third embodiment are basically similar to the configuration and operation of the variable compression ratio internal combustion engine according to the first embodiment except for the points explained below.

Figure 14:
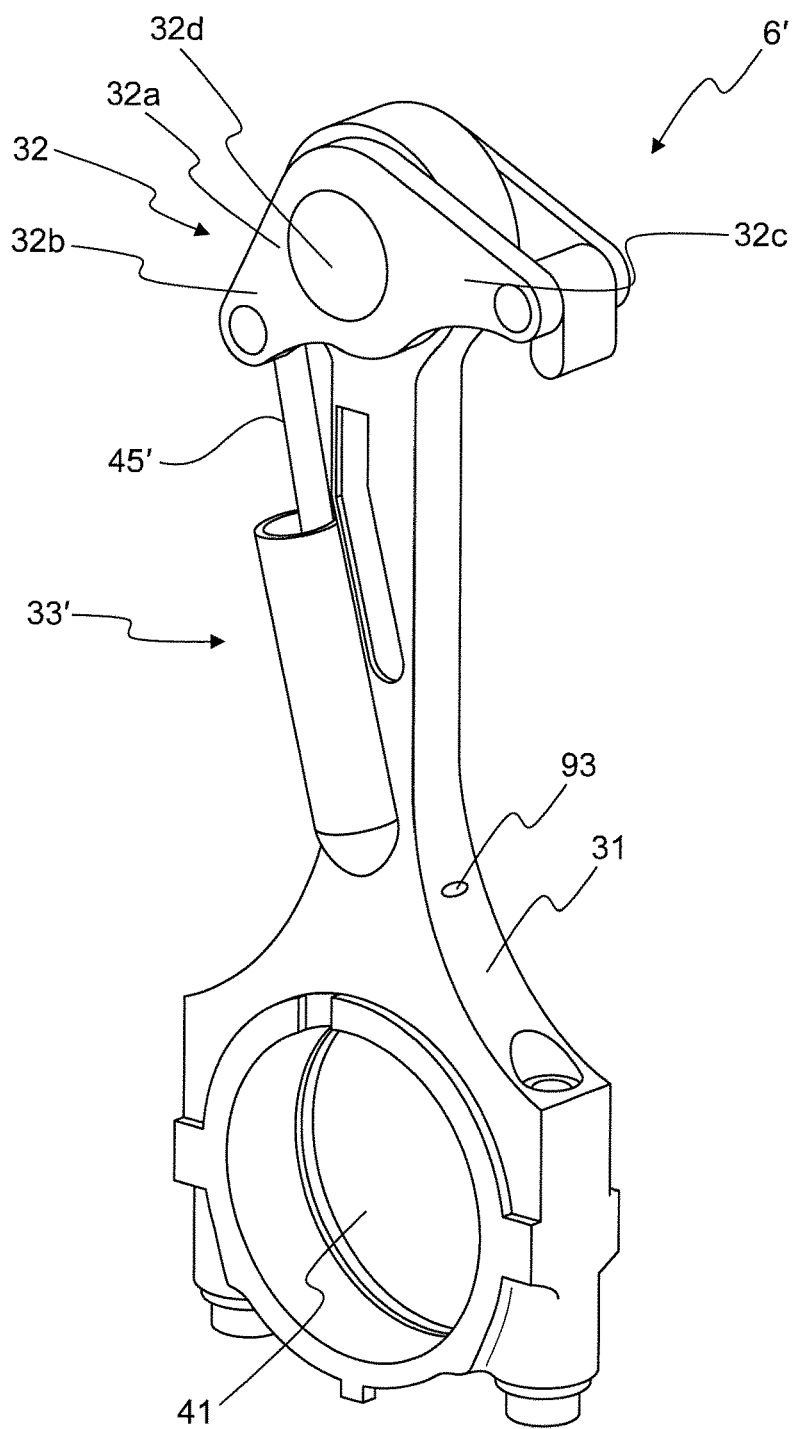
FIG. 14 is a perspective view schematically showing a variable length connecting rod according to the third embodiment.
Figure 15:
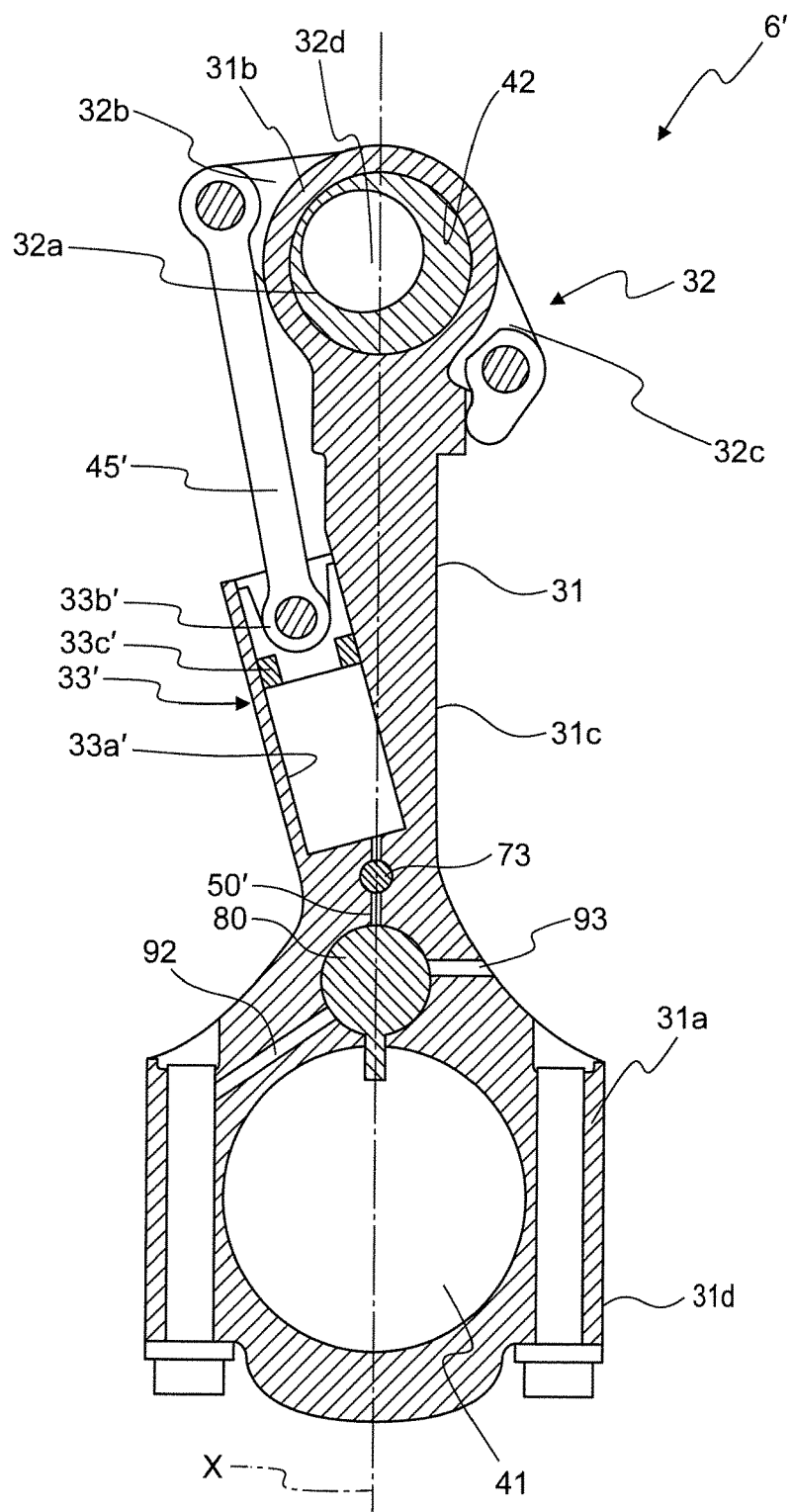
FIG. 15 is a side cross-sectional view schematically showing a variable length connecting rod according to the third embodiment.

FIG. 14 is a perspective view schematically showing a variable length connecting rod 6' according to the third embodiment. FIG. 15 is a side cross-sectional view schematically showing a variable length connecting rod 6' according to the third embodiment. In the third embodiment, the variable length connecting rod 6' is provided with a connecting rod body 31, an eccentric member 32 attached to the connecting rod body 31 to be able to rotate, a hydraulic piston mechanism 33' provided at the connecting rod body 31, and a connecting member 45' connecting the eccentric member 32 and the hydraulic piston mechanism 33'. Unlike the first embodiment, the variable length connecting rod 6' is provided with a single hydraulic piston mechanism 33' and a single connecting member 45'.

The hydraulic piston mechanism 33' has a hydraulic cylinder 33*a*' formed at a rod part 31*c* of the connecting rod body 31, a hydraulic piston 33*b*' sliding inside of the hydraulic cylinder 33*a*', and an oil seal 33*c*' sealing in the hydraulic oil supplied to the inside of the hydraulic cylinder 33*a*'. The hydraulic cylinder 33*a*' is almost entirely or entirely arranged at the first arm 32*b* side from the axial line X of the connecting rod 6'. Further, the hydraulic cylinder 33*a*' extends slanted by exactly a certain extent of angle from the axial line X so as to project out further to the outside in the width direction of the connecting rod body 31 the closer to the small diameter end part 31*b*.

Further, the variable length connecting rod 6' is further provided with a flow direction switching mechanism switching the flow of hydraulic oil to the hydraulic piston mechanism 33'. The flow direction switching mechanism is provided with a hydraulic oil path 50' through which the hydraulic oil flows, a check valve 73 and spool 80 controlling the flow of hydraulic oil, and a biasing member 61 switching the position of the spool 80. The hydraulic oil path 50' is formed at the inside of the connecting rod body 31. Unlike the first embodiment, the variable length connecting rod 6' is provided with a single check valve 73 and a single spool 80

The check valve 73 is arranged at the piston pin receiving opening 32*d* side from the spool 80 in the axial line direction X of the connecting rod 6. Further, the check valve 73 and the spool 80 is arranged on the axial line X of the connecting rod 6'. Note that, the layout of the spool 80 and check valve 73 may differ from the layout shown in FIG. 15 so long as the check valve 73 is arranged at the hydraulic oil path 50 between the hydraulic cylinder 33*a*' and the spool 80. The spool 80 is selectively switched between a first operating position and a second operating position by biasing member 61 arranged in the crank pin 17*a* of the crankshaft 17 in the same way as the first embodiment.

Figure 16:
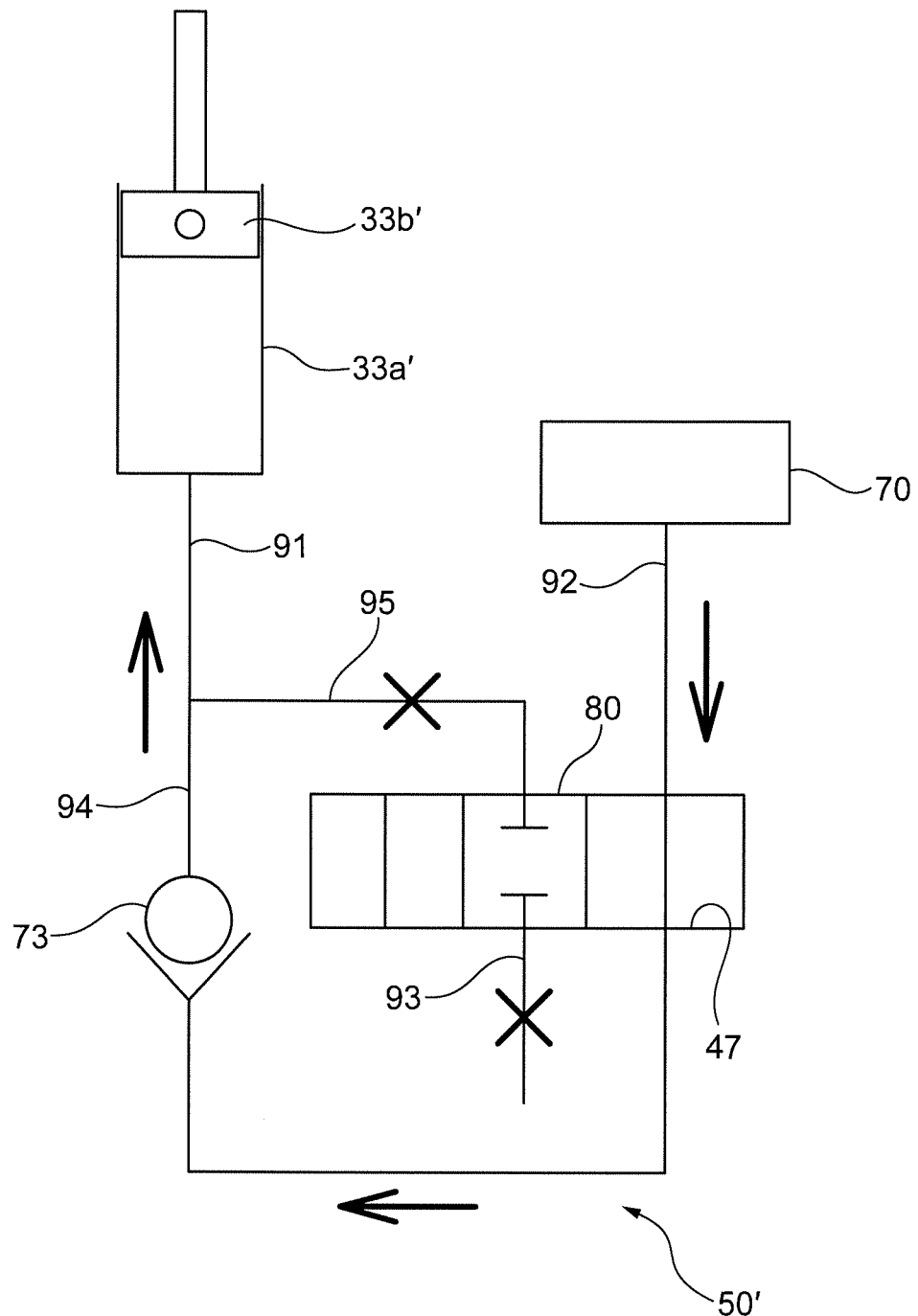
FIG. 16 is a view schematically showing a hydraulic oil path in the third embodiment of the present invention.
Figure 17:
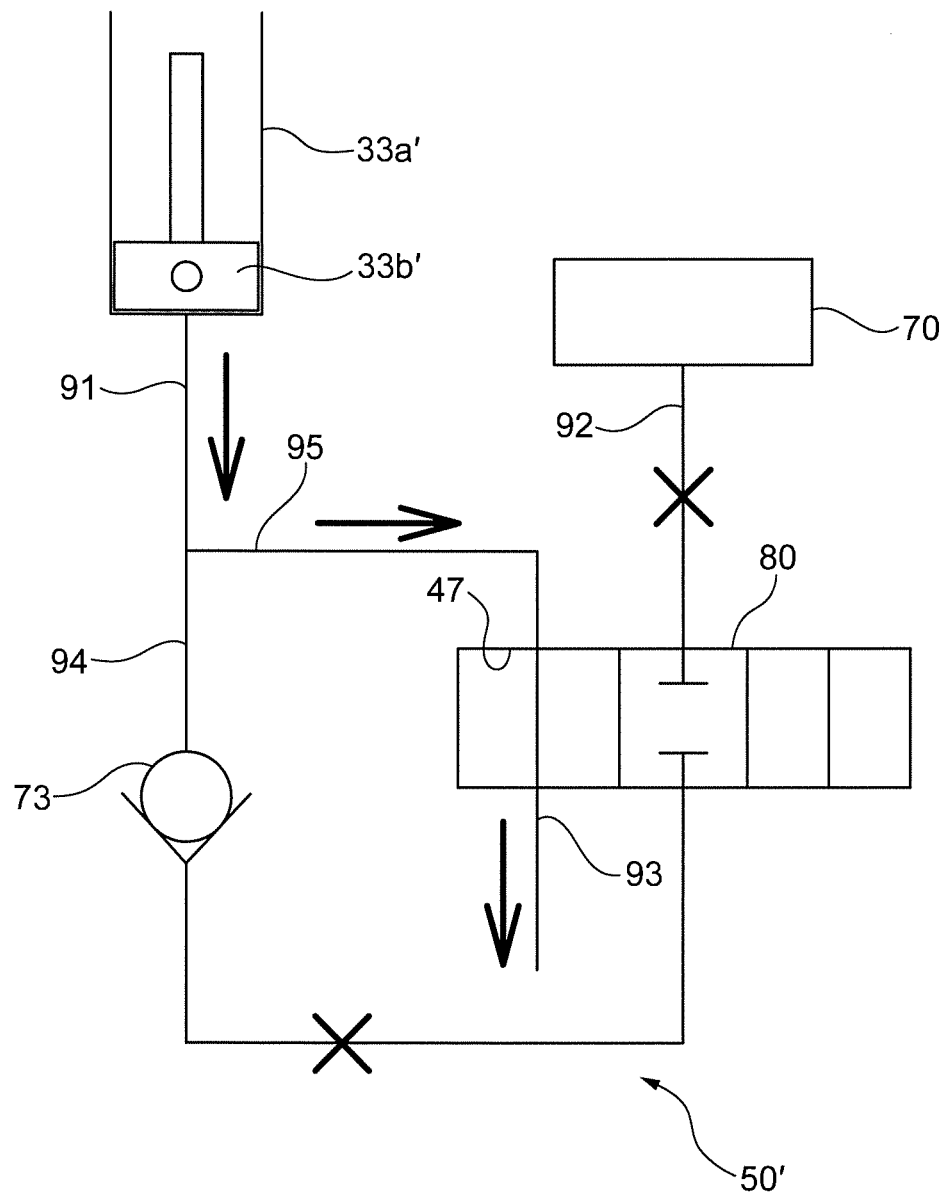
FIG. 17 is a view schematically showing a hydraulic oil path in the third embodiment of the present invention.

FIG. 16 and FIG. 17 are views schematically showing the hydraulic oil path 50' in a third embodiment of the present invention. The hydraulic oil path 50' has a cylinder communicating oil path 91 communicated with the hydraulic cylinder 33*a*', a hydraulic oil supply path 92 supplying hydraulic oil from the oil supply device 70, and a discharge path 93 communicating with the outside of the connecting rod body 31. The cylinder communicating oil path 91 is branched into a fourth space communicating oil path 94 and a fifth space communicating oil path 95. The hydraulic oil is supplied through the path inside the crankshaft 17 from the oil supply device 70 to the hydraulic oil supply path 92.

The fourth space communicating oil path 94 and the fifth space communicating oil path 95 are respectively communicated with the cylinder communicating oil path 91 and spool holding space 47. At the fourth space communicating oil path 94, a check valve 73 is arranged. The check valve 73 permits the flow of hydraulic oil to the hydraulic cylinder 33a' from the spool holding space 47 at the fourth space communicating oil path 94 and prohibits the flow of hydraulic oil from the hydraulic cylinder 33a' to the spool holding space 47.

<Operation of Variable Length Connecting Rod>

Next, referring to FIG. 16 to FIGS. 18A and 18B, the operation of the connecting rod 6' will be explained. FIG. 18A shows the state where the hydraulic cylinder 33a' is supplied with hydraulic oil. On the other hand, FIG. 18B shows the state where the hydraulic cylinder 33a' is not supplied with hydraulic oil.

In the same way as in the first embodiment, when the biasing member 61 is positioned at the first biasing position, the spool 80 is positioned at the first operating position. In other words, when the biasing member 61 is supplied with the threshold value or more of oil pressure, the spool 80 is positioned at the first operating position. FIG. 16 shows the flow of hydraulic oil when the spool 80 is positioned at the first operating position. At the first operating position, the spool 80 cuts the communication between the fifth space communicating oil path 95 and the discharge path 93, and communicates the hydraulic oil supply path 92 and the fourth space communicating oil path 94 through the spool holding space 47. As a result, the supply of hydraulic oil to the hydraulic cylinder 33a' is permitted and the discharge of hydraulic oil from the hydraulic cylinder 33a' is prohibited. Therefore, at the first operating position, the spool 80 permits the supply of hydraulic oil through the hydraulic oil path 50' to the hydraulic cylinder 33a' and prohibits the discharge of hydraulic oil through the hydraulic oil path 50' from the hydraulic cylinder 33a'.

The hydraulic oil supplied from the oil supply device 70 passes through the hydraulic oil supply path 92, fourth space communicating oil path 94, and cylinder communicating oil path 91, and is supplied to the hydraulic cylinder 33a'. For this reason, the hydraulic piston 33b' ascends.

The eccentric member 32 moves in linkage with the hydraulic piston 33b' so as to change the effective length of the connecting rod 6'. For this reason, as shown in FIG. 18A, the eccentric member 32 is turned in the direction of the arrow mark in the figure and the piston pin receiving opening 32d ascends in position. As a result, the length between the center of the crank receiving opening 41 and the center of the piston pin receiving opening 32d, that is, the effective length of the connecting rod 6', becomes longer and becomes L1 in the figure. Therefore, if using the biasing member 61 to move the spool 80 to the first operating position, the effective length of the connecting rod 6' becomes longer and, in turn, the mechanical compression ratio at the internal combustion engine becomes higher.

On the other hand, in the same way as the first embodiment, when the biasing member 61 is positioned at the second biasing position, the spool 80 is positioned at the second operating position. In other words, when the biasing member 61 is supplied with less than the threshold value of oil pressure or is not supplied with oil pressure, the spool 80 is positioned at the second operating position. FIG. 17 shows the flow of hydraulic oil when the spool 80 is positioned at the second operating position. At the second position, the spool 80 communicates the fifth space communicating oil path 95 and the discharge path 93 through the spool holding space 47 and cuts the hydraulic oil supply path 92 and fourth space communicating oil path 94. As a result, the supply of hydraulic oil to the hydraulic cylinder 33a' is prohibited and discharge of hydraulic oil from the hydraulic cylinder 33a' is permitted. Therefore, at the second operating position, the spool 80 prohibits the supply of hydraulic oil through the hydraulic oil path 50' to the hydraulic cylinder 33a' and permits the discharge of hydraulic oil through the hydraulic oil path 50' from the hydraulic cylinder 33a'.

In this regard, if the downward inertial force generated by reciprocating motion of the piston 5 inside the cylinder 15 of the internal combustion engine 1 and the downward explosive force generated by combustion of the air-fuel mixture inside a combustion chamber 7 act on the piston pin 21, a downward force acts on the hydraulic piston 33b'. If this inertial force and explosive force are generated after the spool 80 moves to the second operating position, the hydraulic oil inside the hydraulic cylinder 33a' is discharged from the hydraulic cylinder 33a'. As a result, the hydraulic oil inside the hydraulic cylinder 33a' passes through the cylinder communicating oil path 91, the fifth space communicating oil path 95, and the discharge path 93, and is discharged to the outside of the connecting rod body 31. For this reason, the hydraulic piston 33b' descends.

The eccentric member 32 moves in linkage with the hydraulic piston 33b' so as to change the effective length of the connecting rod 6'. For this reason, as shown in FIG. 18B, the eccentric member 32 is turned in the direction of the arrow mark in the figure (opposite direction to arrow mark of FIG. 18A) and the piston pin receiving opening 32d descends in position. As a result, the length between the center of the crank receiving opening 41 and the center of the piston pin receiving opening 32d, that is, the effective length of the connecting rod 6', becomes L2 shorter than L1 in the figure. Therefore, if using the biasing member 61 to make the spool 80 move to the second operating position, the effective length of the connecting rod 6' becomes shorter and, in turn, the mechanical compression ratio at the internal combustion engine becomes lower.

In the third embodiment, as explained above, it is possible to use the biasing member 61 to switch the spool 80 between the first operating position and the second operating position to thereby switch the effective length of the connecting rod 6' between L1 and L2. As a result, in an internal combustion engine 1 provided with the connecting rod 6', it is possible to change the mechanical compression ratio.

In the third embodiment, in the same way as the first embodiment, the biasing member 61 switching the position of the spool 80 are arranged in the crank pin 17a of the crankshaft 17. For this reason, it is possible to keep the engine body from becoming larger while changing the effective length of the connecting rod 6'. Further, there is no need to supply oil pressure for controlling the biasing member 61 to the connecting rod body 31, so it is possible to shorten the oil pressure supply path and possible to improve the response when switching the mechanical compression ratio of the internal combustion engine.

Further, in the third embodiment, unlike the first embodiment, there are a single hydraulic piston mechanism and a single connecting member. For this reason, the number of parts of the variable length connecting rod can be reduced.

As a result, in the third embodiment, it is possible to reduce the total weight and manufacturing cost of the variable length connecting rod.

Note that, in the third embodiment, the eccentric member 32 corresponds to the linking member moving in linkage with the hydraulic piston 33b' so as to change the effective length of the connecting rod 6'. However, the linking member may be a member such as described in PLT 3 moving linearly in the axial line direction of the connecting rod together with the hydraulic piston.

<Other Embodiments>

Below, preferred embodiments according to the present invention were explained, but the present invention is not limited to these embodiments. Various modifications and changes may be made within the language of the claims. For example, the direction of movement of the spool 80 by the biasing member 61 may be slanted with respect to the center axial line of the crank receiving opening 41. Further, the hydraulic oil paths 50, 50' in the embodiments may be different from the hydraulic oil paths shown in FIG. 10, FIG. 11, FIG. 16, and FIG. 17 so long as able to switch the flow of hydraulic oil due to movement of the spool 80. For example, in the first embodiment and the second embodiment, the hydraulic oil path 50 may have a refill path for refilling new hydraulic oil when hydraulic oil leaks from the hydraulic piston mechanisms 33, 34 etc. In this case, the refill path is supplied with hydraulic oil through a path formed inside the crankshaft 17 from an oil pressure supply source at the outside of the connecting rod body 31.

Further, the above embodiments can be carried out in any combinations. For example, in the third embodiment, like in the second embodiment, the biasing member 61 may be switched between the first biasing position switching the spool 80 to the first operating position and the second biasing position switching the spool 80 to the second operating position by the oil pressure supplied to one end part of the biasing member 61 and the oil pressure supplied to the other end part of the biasing member 61.

Note that, in this Description, rise of the hydraulic piston means that the hydraulic piston moves so as to approach the small diameter end part 31b of the connecting rod body in the axial direction of the connecting rod, while descent of the hydraulic piston means that the hydraulic piston moves so as to be away from the small diameter end part in the axial direction of the connecting rod.

REFERENCE SIGNS LIST 1. internal combustion engine
6, 6'. connecting rod
17. crankshaft
17a. crank pin
21. piston pin
31. connecting rod body
32. eccentric member
32d. piston pin receiving opening
33a. first hydraulic cylinder
33b. first hydraulic piston
34a. second hydraulic cylinder
34b. second hydraulic piston
33a'. hydraulic cylinder
33b'. hydraulic piston
41. crank receiving opening
50, 50'. hydraulic oil path
61. biasing member
80. spool

The invention claimed is:

1. A variable compression ratio internal combustion engine comprising a crankshaft and a connecting rod connected to the crankshaft, wherein
the connecting rod comprises
a connecting rod body provided with a crank receiving opening receiving a crank pin of the crankshaft,
a first hydraulic cylinder formed at the connecting rod body and to which hydraulic oil is supplied,
a first hydraulic piston sliding inside the first hydraulic cylinder,
a second hydraulic cylinder formed at the connecting rod body and to which hydraulic oil is supplied,
a second hydraulic piston sliding inside the second hydraulic cylinder,
a linking member provided with a piston pin receiving opening receiving a piston pin and moving in linkage with the first hydraulic piston and the second hydraulic piston so as to change a length between a center of the piston pin receiving opening and a center of the crank receiving opening,
a hydraulic oil path formed inside the connecting rod body and communicating with the first hydraulic cylinder and the second hydraulic cylinder, and
a spool arranged inside the hydraulic oil path and moving between a first operating position prohibiting supply of hydraulic oil through the hydraulic oil path from the first hydraulic cylinder to the second hydraulic cylinder and permitting supply of hydraulic oil through the hydraulic oil path from the second hydraulic cylinder to the first hydraulic cylinder, and a second operating position permitting supply of hydraulic oil through the hydraulic oil path from the first hydraulic cylinder to the second hydraulic cylinder and prohibiting supply of hydraulic oil through the hydraulic oil path from the second hydraulic cylinder to the first hydraulic cylinder, characterized in that
the variable compression ratio internal combustion engine further comprises
a biasing member arranged inside the crank pin and biasing the spool so as to selectively switch a position of the spool between the first operating position and the second operating position.

2. The variable compression ratio internal combustion engine according to claim 1, wherein
the engine further comprises a biasing spring biasing the biasing member, and
the biasing member is switched by oil pressure supplied to the biasing member so as to make the biasing spring contract and the biasing force of the biasing spring between a first biasing position switching the spool to the first operating position and a second biasing position switching the spool to the second operating position.

3. The variable compression ratio internal combustion engine according to claim 2, wherein the spool moves in parallel with a center axial line of the crank receiving opening when it moves between the first operating position and the second operating position.

4. The variable compression ratio internal combustion engine according to claim 1, wherein the biasing member is switched by oil pressure supplied to one end part of the biasing member and oil pressure supplied to the other end part of the biasing member between a first biasing position switching the spool to the first operating position and a second biasing position switching the spool to the second operating position.

5. The variable compression ratio internal combustion engine according to claim 4, wherein the spool moves in parallel with a center axial line of the crank receiving opening when it moves between the first operating position and the second operating position.

6. The variable compression ratio internal combustion engine according to claim 1, wherein the spool moves in parallel with a center axial line of the crank receiving opening when it moves between the first operating position and the second operating position.

7. A variable compression ratio internal combustion engine comprising a crankshaft and a connecting rod connected to the crankshaft, wherein the connecting rod comprises a connecting rod body provided with a crank receiving opening receiving a crank pin of the crankshaft, a hydraulic cylinder formed at the connecting rod body and to which hydraulic oil is supplied, a hydraulic piston sliding inside the hydraulic cylinder, a linking member provided with a piston pin receiving opening receiving a piston pin and moving in linkage with the hydraulic piston so as to change a length between a center of the piston pin receiving opening and a center of the crank receiving opening, a hydraulic oil path formed inside the connecting rod body and communicating with the hydraulic cylinder, and a spool arranged inside the hydraulic oil path and moving between a first operating position permitting supply of hydraulic oil through the hydraulic oil path to the hydraulic cylinder and prohibiting discharge of hydraulic oil through the hydraulic oil path from the hydraulic cylinder, and a second operating position prohibiting supply of hydraulic oil through the hydraulic oil path to the hydraulic cylinder and permitting discharge of hydraulic oil through the hydraulic oil path from the hydraulic cylinder, characterized in that the variable compression ratio internal combustion engine further comprises a biasing member arranged inside the crank pin and biasing the spool so as to selectively switch a position of the spool between the first operating position and the second operating position.

8. The variable compression ratio internal combustion engine according to claim 7, wherein the engine further comprises a biasing spring biasing the biasing member, and the biasing member is switched by oil pressure supplied to the biasing member so as to make the biasing spring contract and the biasing force of the biasing spring between a first biasing position switching the spool to the first operating position and a second biasing position switching the spool to the second operating position.

9. The variable compression ratio internal combustion engine according to claim 8, wherein the spool moves in parallel with a center axial line of the crank receiving opening when it moves between the first operating position and the second operating position.

10. The variable compression ratio internal combustion engine according to claim 7, wherein the biasing member is switched by oil pressure supplied to one end part of the biasing member and oil pressure supplied to the other end part of the biasing member between a first biasing position switching the spool to the first operating position and a second biasing position switching the spool to the second operating position.

11. The variable compression ratio internal combustion engine according to claim 10, wherein the spool moves in parallel with a center axial line of the crank receiving opening when it moves between the first operating position and the second operating position.

12. The variable compression ratio internal combustion engine according to claim 7, wherein the spool moves in parallel with a center axial line of the crank receiving opening when it moves between the first operating position and the second operating position.

* * * * *